(12) United States Patent
Kubo et al.

(10) Patent No.: US 11,021,361 B2
(45) Date of Patent: Jun. 1, 2021

(54) NOZZLE GUIDE

(71) Applicant: TOYODA GOSEI CO., LTD., Kiyosu (JP)

(72) Inventors: Tomohiro Kubo, Kiyosu (JP);
Tomokazu Sobajima, Kiyosu (JP);
Norihiko Ishihara, Kiyosu (JP);
Tatsuya Nomura, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/914,701

(22) Filed: Jun. 29, 2020

(65) Prior Publication Data

US 2021/0002123 A1    Jan. 7, 2021

(30) Foreign Application Priority Data

Jul. 2, 2019 (JP) .............................. JP2019-123304
Jul. 2, 2019 (JP) .............................. JP2019-123305

(51) Int. Cl.
*B67D 7/04* (2010.01)
*B67D 7/38* (2010.01)
*B60K 15/035* (2006.01)

(52) U.S. Cl.
CPC .............. *B67D 7/048* (2013.01); *B67D 7/38* (2013.01); *B60K 2015/03538* (2013.01); *B60K 2015/03542* (2013.01); *B60K 2015/03552* (2013.01)

(58) Field of Classification Search
CPC ........ B67D 7/38; B67D 7/048; B67D 7/0476; B60K 2015/03542; B60K 2015/03552; B60K 2015/03538

USPC ............................................. 141/59; 137/588
See application file for complete search history.

(56) References Cited

U.S. PATENT DOCUMENTS

| 4,185,844 | A |   | 1/1980  | Hubbard et al. |
| 4,706,708 | A | * | 11/1987 | Fornuto ........... B60K 15/03519 137/588 |
| 4,724,861 | A | * | 2/1988  | Covert ................... B60K 15/04 137/202 |

(Continued)

FOREIGN PATENT DOCUMENTS

| JP | S61-53220 U   | 4/1986 |
| JP | H11-198667 A  | 7/1999 |

(Continued)

*Primary Examiner* — Timothy L Maust
(74) *Attorney, Agent, or Firm* — Posz Law Group, PLC

(57) ABSTRACT

An object is to enhance the assembly of a breather pipe which is accommodated in a filler pipe.
A nozzle guide (10, 10a, 10b) that is arranged within a filler pipe (110) includes: a main body portion (20, 20b) that guides the insertion and removal of a refueling nozzle (150); and a connection member (50, 50a to 50c) that is provided on an outer circumferential surface (27) of the main body portion (20, 20b) and in which an upper end portion (51) of the connection member is located, in a tank direction (TD) extending from a refueling port (FC) toward a fuel tank (FT), on a downstream side with respect to a tip end portion (152) of the refueling nozzle (150), and the connection member (50, 50a to 50c) includes: a connection portion (52, 52a) connected to a breather pipe (120) that is arranged within the filler pipe (110); and a vapor flow path formation portion (55, 55b, 55c) that forms part of a vapor flow path (220) for the fuel vapor that flows in through the breather pipe (120) and the connection portion (52, 52a).

14 Claims, 33 Drawing Sheets

(56) References Cited

U.S. PATENT DOCUMENTS

| | | | | |
|---|---|---|---|---|
| 4,765,504 A * | 8/1988 | Sherwood | ........ | B60K 15/03519 141/59 |
| 4,926,914 A * | 5/1990 | Morizumi | ........ | B60K 15/03519 123/519 |
| 4,932,444 A * | 6/1990 | Micek | .............. | B60K 15/03504 123/519 |
| 4,944,779 A * | 7/1990 | Szlaga | ............. | B60K 15/03504 123/519 |
| 5,022,433 A * | 6/1991 | Jansky | ................... | B60K 15/04 137/588 |
| 5,033,517 A * | 7/1991 | Bucci | ................. | B60K 15/0406 141/59 |
| 6,105,612 A * | 8/2000 | Schaar | ................. | B60K 15/035 123/519 |
| 7,082,973 B2 * | 8/2006 | Ganachaud | ............ | B60K 15/04 141/350 |
| 9,764,637 B2 * | 9/2017 | Brown | ................... | B60K 15/04 |
| 2016/0361993 A1 | 12/2016 | Kito et al. | | |
| 2018/0229599 A1 | 8/2018 | Suda et al. | | |

FOREIGN PATENT DOCUMENTS

| | | |
|---|---|---|
| JP | 2017-1660 A | 1/2017 |
| JP | 2018-131087 A | 8/2018 |

* cited by examiner

NOZZLE GUIDE

CROSS REFERENCE TO RELATED APPLICATIONS

This application claims priority based on Japanese Patent Application No. 2019-123304 filed on Jul. 2, 2019 and Japanese Patent Application No. 2019-123305 filed on Jul. 2, 2019, the entire disclosures of which are hereby incorporated by reference.

BACKGROUND

Field

The present disclosure relates to a nozzle guide which guides the insertion and removal of a refueling nozzle in a fuel supply device.

Related Art

Conventionally, as a fuel supply device which supplies a fuel to a fuel tank installed in a vehicle or the like, a fuel supply device is used which includes a filler pipe for connecting a refueling port and the fuel tank and a breather pipe for discharging fuel vapor within the fuel tank. In a fuel supply device disclosed in Japanese Unexamined Utility Model Application Publication No. 61-53220, a breather pipe is arranged within a filler pipe, and thus the space and the cost thereof are reduced.

In the fuel supply device disclosed in Japanese Unexamined Utility Model Application Publication No. 61-53220, there is room for improvement in the assembly of the breather pipe. Hence, it is desired to provide a technology which enhances the assembly of a breather pipe arranged within a filler pipe.

SUMMARY

According to one aspect of the present disclosure, a nozzle guide is provided. The nozzle guide is a nozzle guide arranged, in a fuel supply device, within a filler pipe that forms a fuel flow path for a fuel supplied from a refueling nozzle, and includes: a main body portion which guides the insertion and removal of the refueling nozzle; and a connection member which is provided on an outer circumferential surface of the main body portion and in which an upper end portion of the connection member is located, in a tank direction extending from a refueling port toward a fuel tank, on a downstream side with respect to a tip end portion of the refueling nozzle inserted into the main body portion, and the connection member includes: a connection portion which is connected to a breather pipe that is arranged within the filler pipe and that discharges fuel vapor within the fuel tank; and a vapor flow path formation portion which communicates with the breather pipe through the connection portion and which forms part of a vapor flow path for the fuel vapor that flows in through the breather pipe and the connection portion.

DETAILED DESCRIPTION

A. First Embodiment

Figure 1:
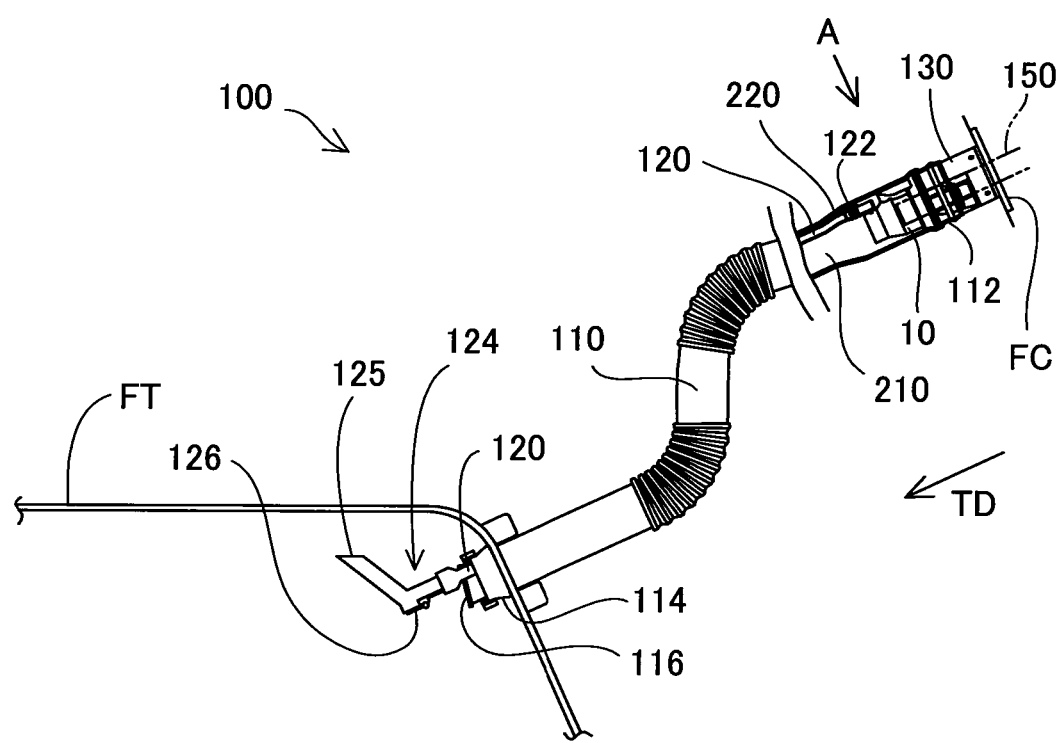
FIG. 1 is a schematic view showing a schematic configuration of a fuel supply device.

FIG. 1 is a schematic view showing a schematic configuration of a fuel supply device 100 to which a nozzle guide 10 in an embodiment of the present disclosure is applied. The fuel supply device 100 is mounted on a vehicle, and supplies, to a fuel tank FT, a fuel discharged from a refueling nozzle 150 inserted into a refueling port FC. In the following description, a side on which the refueling port FC is provided with respect to a filler pipe 110 is also referred to as an upstream side, and a side on which the fuel tank FT is provided is also referred to as a downstream side. In a macroscopic view, a direction extending from the refueling port FC toward the fuel tank FT, that is, a direction extending from the upstream side toward the downstream side is also referred to as a "tank direction TD". The fuel supply device 100 includes the filler pipe 110, a breather pipe 120, an opening formation member 130 and the nozzle guide 10. In FIG. 1, for convenience of illustration, the upstream end 112 of the filler pipe 110 and the fuel tank FT are shown in a cross section, and the other configurations are shown in an external view. The refueling nozzle 150 is indicated by chain double-dashed lines.

The filler pipe 110 is configured with a resin pipe which has flexibility, and forms a fuel flow path (hereinafter also simply referred to as a "fuel flow path 210") for the fuel supplied from the refueling nozzle 150. As will be described later, the upstream end 112 of the filler pipe 110 is connected to the opening formation member 130. The downstream end 114 of the filler pipe 110 is connected to the fuel tank FT. In the downstream end 114 of the filler pipe 110, a check valve 116 is provided which reduces the backflow of the fuel. When the fuel is supplied from the refueling nozzle 150, the check valve 116 is brought into an opened state whereas when the liquid level of the fuel stored within the fuel tank FT is raised such that the check valve 116 is immersed in the fuel, the check valve 116 is brought into a closed state. FIG. 1 shows the check valve 116 in the closed state.

The breather pipe 120 is arranged within the filler pipe 110. The breather pipe 120 forms a vapor flow path (hereinafter also simply referred to as a "vapor flow path 220") for discharging fuel vapor within the fuel tank FT. The breather pipe 120 returns the fuel vapor to the fuel flow path 210 so as to release the inner pressure of the fuel tank FT. As will be described later, the upstream end 122 of the breather pipe 120 is connected to the nozzle guide 10. The downstream end 124 of the breather pipe 120 is exposed to the interior of the fuel tank FT. An opening portion 125 is formed in the downstream end 124. The opening portion 125 is formed at the same height as a liquid level when the fuel tank FT is filled up. An opening/closing valve 126 is provided in the downstream end 124. When the liquid level of the fuel stored within the fuel tank FT is lowered below the opening/closing valve 126, the opening/closing valve 126 is brought into the opened state by its weight so as to discharge, into the fuel tank FT, the fuel mixed into the breather pipe 120. When the liquid level of the fuel stored within the fuel tank FT is raised, the opening/closing valve 126 is brought into the closed state by buoyancy so as to reduce the mixing of the fuel into the breather pipe 120 at the time of refueling. FIG. 1 shows the opening/closing valve 126 in the closed state.

Figure 2:
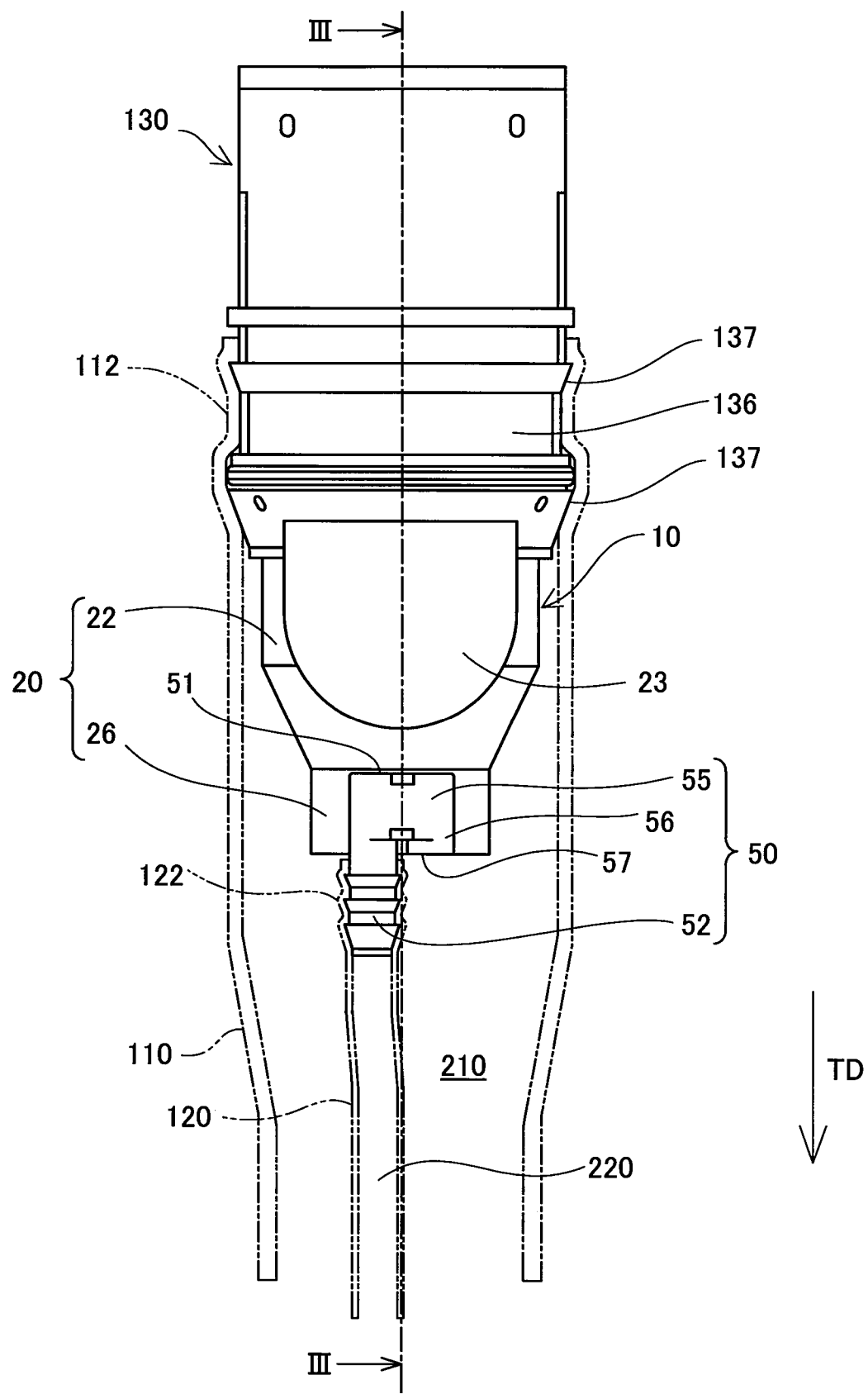
FIG. 2 is a front view showing the configurations of an opening formation member and a nozzle guide.
Figure 3:
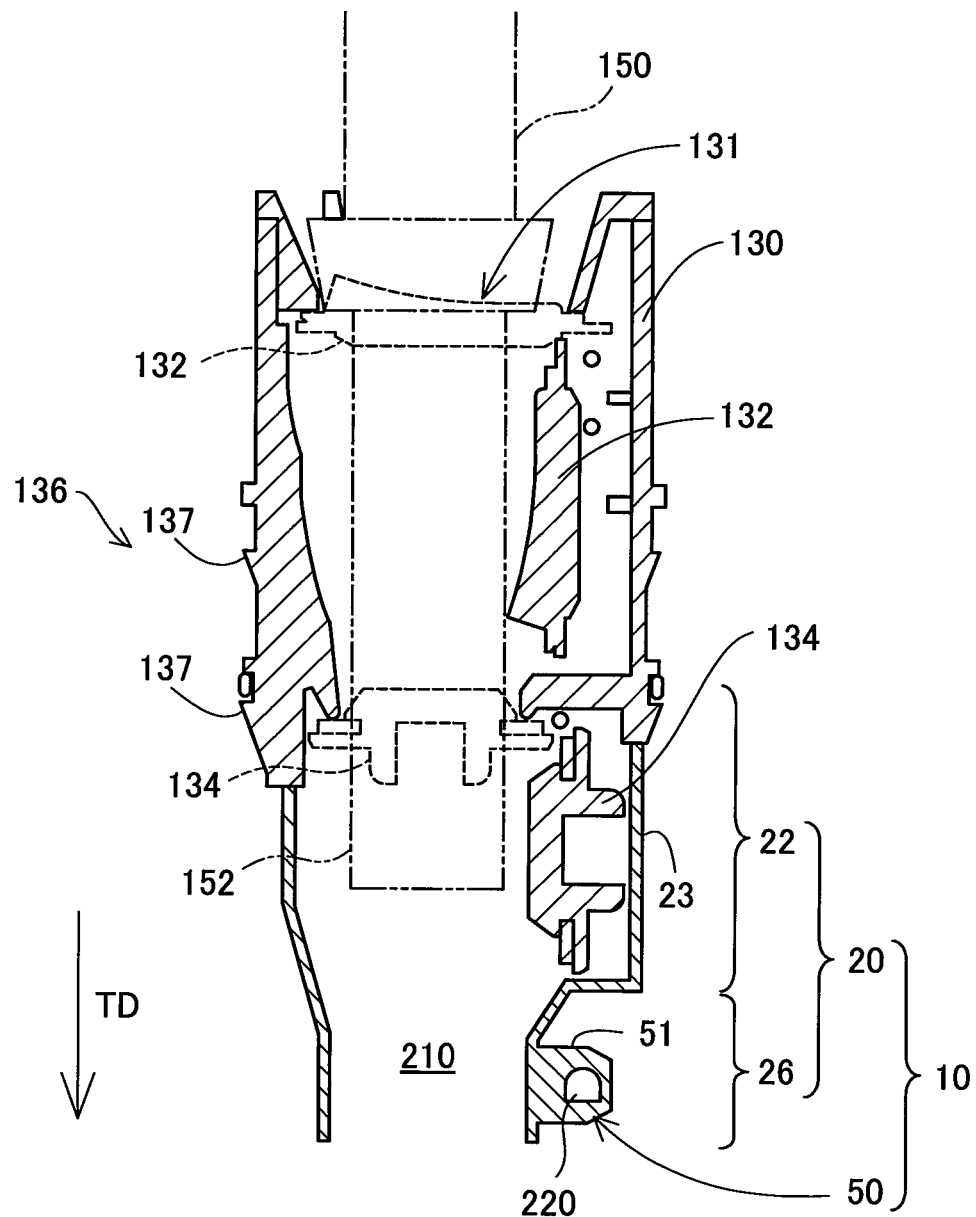
FIG. 3 is a cross-sectional view showing a cross section taken along the line III-III of FIG. 2.

FIG. 2 is a front view showing the configurations of the opening formation member 130 and the nozzle guide 10. FIG. 2 corresponds to a diagram which is seen from an arrow A in FIG. 1. In FIG. 2, for convenience of illustration, the upstream end 112 of the filler pipe 110 and the upstream end 122 of the breather pipe 120 are indicated by chain double-dashed lines. FIG. 3 is a cross-sectional view showing a cross section taken along the line III-III of FIG. 2. In FIG. 3, for convenience of illustration, the position of the refueling nozzle 150 at the time of refueling is indicated by chain double-dashed lines, and a lid member 132 and an opening/closing member 134 in the closed state are indicated by broken lines. In FIG. 3, the illustration of the filler pipe 110 and the breather pipe 120 is omitted.

As shown in FIG. 3, the opening formation member 130 has a substantially tubular external shape, and forms a supply port 131 through which the refueling nozzle 150 is inserted. The opening formation member 130 is also called a so-called a capless, and opens and closes the supply port 131 without use of a fuel cap. The opening formation member 130 includes the lid member 132, the opening/closing member 134 and a pipe connection portion 136. The nozzle guide 10 is connected to the end portion of the opening formation member 130 on the downstream side.

The lid member 132 is provided in the end portion of the opening formation member 130 on the upstream side, and opens and closed the supply port 131. The lid member 132 blocks the supply port 131 so as to reduce the entry of foreign matter from the refueling port FC, and is pushed by a tip end portion 152 of the refueling nozzle 150 at the time of refueling so as to bring the supply port 131 into the opened state. The lid member 132 is accommodated within the opening formation member 130 in a state where the supply port 131 is opened.

The opening/closing member 134 is provided at an end portion of the opening formation member 130 on the downstream side, and opens and closes the fuel flow path 210. The opening/closing member 134 is normally closed so as to reduce the flow of the fuel vapor out to the exterior of the fuel supply device 100. The opening/closing member 134 is pushed by the tip end portion 152 of the refueling nozzle 150 at the time of refueling so as to bring the fuel flow path 210 into the opened state. The opening/closing member 134 is accommodated in the accommodation portion 23 of the nozzle guide 10, which will be described later, at the time of refueling.

The pipe connection portion 136 is formed on an outer circumferential surface of the opening formation member 130. The pipe connection portion 136 includes a plurality of protrusions 137 which are protruded outward in a radial direction, and has a so-called fir tree-shaped external shape. As shown in FIG. 2, the pipe connection portion 136 is press-fitted into the upstream end 112 of the filler pipe 110.

Figure 4:
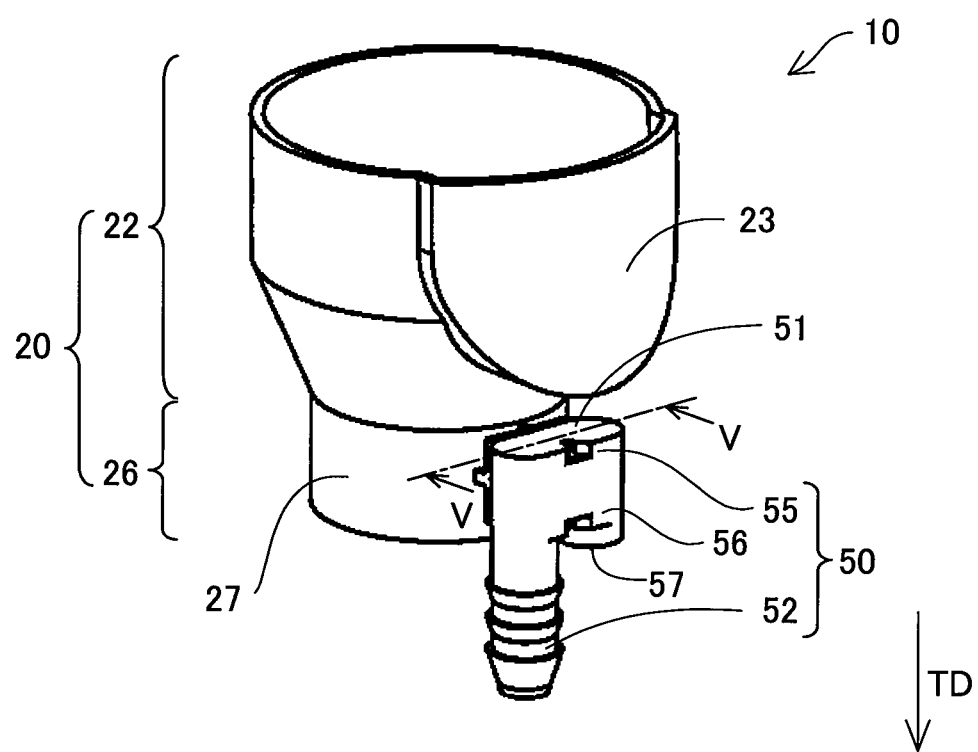
FIG. 4 is a perspective view showing a schematic configuration of the nozzle guide.

FIG. 4 is a perspective view showing a schematic configuration of the nozzle guide 10. The nozzle guide 10 is connected to the end portion of the opening formation member 130 on the downstream side as shown in FIG. 3, and is arranged within the filler pipe 110 as shown in FIG. 2. The nozzle guide 10 has the function of guiding the insertion and removal of the refueling nozzle 150 so as to stabilize the refueling and has the function of fixing the breather pipe 120. In the present embodiment, the nozzle guide 10 and the opening formation member 130 are fixed to each other by welding. The nozzle guide 10 includes a main body portion 20 and a connection member 50.

The main body portion 20 has a substantially cylindrical external shape and guides the insertion and removal of the refueling nozzle 150. The main body portion 20 includes an insertion portion 22 which forms part of the main body portion 20 on the upstream side in the tank direction TD and a flow path formation portion 26 which forms part of the main body portion 20 on the downstream side in the tank direction TD.

As shown in FIG. 3, the tip end portion 152 of the refueling nozzle 150 is inserted into the insertion portion 22 at the time of refueling. As shown in FIGS. 2 and 4, the accommodation portion 23 is formed in part of the insertion portion 22 in a circumferential direction. As shown in FIG. 3, the accommodation portion 23 accommodates the opening/closing member 134 which is opened at the time of refueling. Although the accommodation portion 23 of the present embodiment is formed so as to be able to accommodate the entire opening/closing member 134, the accommodation portion 23 may be formed so as to be able to accommodate part of the opening/closing member 134. The dimension of the accommodation portion 23 in the radial direction is greater than the dimension of part of the insertion portion 22 in the radial direction in which the accommodation portion 23 is not formed.

The flow path formation portion 26 communicates with the insertion portion 22 in the tank direction TD, and the diameter thereof is smaller than that of the insertion portion 22. The flow path formation portion 26 forms part of the fuel flow path 210. As shown in FIG. 3, the flow path formation portion 26 is located on the downstream side in the tank direction TD with respect to the position of the tip end portion 152 of the refueling nozzle 150 which is inserted into the insertion portion 22 at the time of refueling. Hence, the tip end portion 152 of the refueling nozzle 150 is not inserted into the flow path formation portion 26. As shown in FIG. 4, on the outer circumferential surface 27 of the flow path formation portion 26, a connection member 50 is provided.

The connection member 50 is provided on the outer circumferential surface 27 of the flow path formation portion 26. More specifically, the connection member 50 is formed in the tank direction TD when seen from the accommodation portion 23. In other words, in the circumferential direction of the nozzle guide 10, the position of formation of the accommodation portion 23 and the position of formation of the connection member 50 coincide with each other. The connection member 50 has an external shape in which a pipe member is bent substantially in the shape of the letter U. As shown in FIG. 3, the upper end portion 51 of the connection member 50 in the tank direction TD is located on the downstream side in the tank direction TD with respect to the tip end portion 152 of the refueling nozzle 150 which is inserted into the insertion portion 22 of the main body portion 20.

The connection member 50 has the function of fixing the breather pipe 120 to the nozzle guide 10, and has the function of discharging the fuel vapor in the tank direction TD. The connection member 50 includes a connection portion 52 and a vapor flow path formation portion 55.

The connection portion 52 has a substantially cylindrical external shape, and is provided so as to extend along the tank direction TD. The connection portion 52 has a so-called fir tree-shaped outer circumferential surface on which a plurality of protrusions are formed so as to protrude outward in the radial direction. As shown in FIG. 2, the connection portion 52 is press-fitted into the upstream end 122 of the breather pipe 120 so as to be connected to the breather pipe 120.

The nozzle guide 10 of the present embodiment is molded of a resin material by injection molding, and the connection member 50 and the main body portion 20 are molded integrally.

Figure 5:
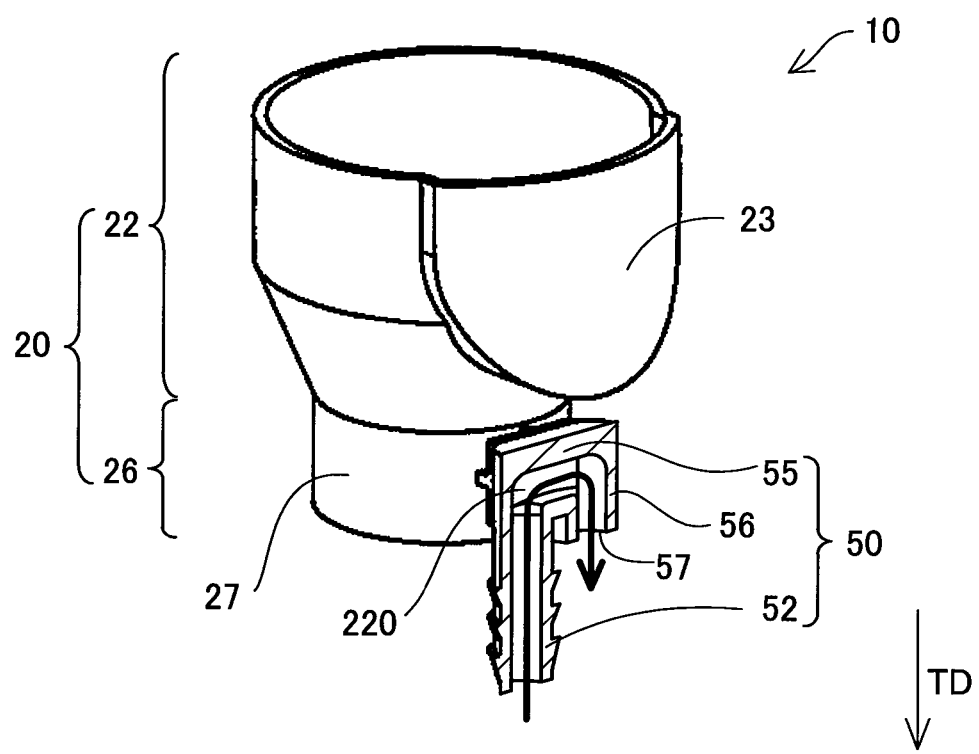
FIG. 5 is a partial cross-sectional view illustrating the configuration of a vapor flow path formation portion.

FIG. 5 is a partial cross-sectional view illustrating the configuration of the vapor flow path formation portion 55. In FIG. 5, in a perspective view similar to FIG. 4, a cross section of the connection member 50 is shown which is taken along the line V-V shown in FIG. 4. The vapor flow path formation portion 55 communicates with the breather pipe 120 through the connection portion 52 so as to form part of the vapor flow path 220 for the fuel vapor which flows in through the breather pipe 120 and the connection portion 52. An end of the vapor flow path formation portion 55 communicates with the connection portion 52. In the other end of the vapor flow path formation portion 55, a discharge flow path formation portion 56 is provided. In the present embodiment, a direction in which the discharge flow path formation portion 56 is provided so as to extend coincides with the tank direction TD. In other words, an angle formed by the direction in which the discharge flow path formation portion 56 is provided so as to extend and the tank direction TD is 0°. That the angle formed by the direction in which the discharge flow path formation portion 56 is provided so as to extend and the tank direction TD is 0° means that the angle is about 0 in a macroscopic view. The discharge flow path formation portion 56 is formed parallel to the connection portion 52. In the discharge flow path formation portion 56, an opening 57 is formed which returns the fuel vapor into the fuel flow path 210 within the filler pipe 110. In other words, the opening 57 is formed so as to be opened in the tank direction TD. Although in the present embodiment, the position of formation of the opening 57 in the tank direction TD coincides with the end portion of the flow path formation portion 26 on the downstream side, the position of formation thereof may be located on the upstream side in the tank direction TD with respect to the end portion of the flow path formation portion 26 on the downstream side or may be located on the downstream side.

The fuel vapor within the fuel tank FT is passed through the breather pipe 120 from the downstream side to the upstream side in the tank direction TD. The fuel vapor described above reaches the connection portion 52 from the breather pipe 120, is passed through the vapor flow path formation portion 55 as indicated by a thick arrow in FIG. 5 and is discharged from the opening 57 of the discharge flow path formation portion 56 into the fuel flow path 210 within the filler pipe 110. Since the direction in which the discharge flow path formation portion 56 is provided so as to extend coincides with the tank direction TD, the direction of flow of the fuel vapor discharged from the discharge flow path formation portion 56 is substantially parallel to the tank direction TD. Hence, the fuel vapor discharged from the opening 57 is made to flow in the tank direction TD together with the flow of the fuel discharged from the refueling nozzle 150 at the time of refueling. In this way, it is possible to return the fuel vapor to the fuel tank FT so as to circulate it, and thus it is possible to reduce the flow of the fuel vapor out from the refueling port FC.

In the nozzle guide 10 of the first embodiment described above, the connection member 50 including the connection portion 52 connected to the breather pipe 120 is provided in the nozzle guide 10, and thus it is possible to fix the upstream end 122 of the breather pipe 120 to the nozzle guide 10. Hence, in a so-called fuel supply device 100 having an inner breather specification in which the breather pipe 120 is arranged within the filler pipe 110, it is possible to simplify the fixed structure of the breather pipe 120, with the result that it is possible to enhance the assembly of the breather pipe 120. Thus, in the nozzle guide 10 of the present embodiment, it is possible to guide the insertion and removal of the refueling nozzle 150 so as to stabilize the refueling and to fix the breather pipe 120 so as to realize the inner breather specification.

The connection member 50 forms the vapor flow path formation portion so as to be able to rectify the flow of the fuel vapor discharged from the breather pipe 120. Hence, it is possible to reduce the bubbling of the supplied fuel caused by the fuel vapor, and thus it is possible to reduce the lowering of the refueling.

The upper end portion 51 of the connection member 50 in the tank direction TD is located on the downstream side in the tank direction TD with respect to the position of the tip end portion 152 of the refueling nozzle 150 which is inserted into the nozzle guide 10 at the time of refueling. Hence, when the tip end portion 152 of the refueling nozzle 150 collides with the inner circumferential surface of the nozzle guide 10, it is possible to reduce the deformation and damage of the connection member 50. Consequently, it is possible to reduce the inhibition of the function of fixing the breather pipe 120 to the nozzle guide 10.

The connection member 50 is provided on the outer circumferential surface of the main body portion 20 in the nozzle guide 10, and thus it is possible to reduce the inhibition of the flow of the fuel discharged from the refueling nozzle 150 and to reduce the inhibition of the function of inserting and removing the refueling nozzle 150. The connection member 50 is provided on the outer circumferential surface 27 of the flow path formation portion 26 in the main body portion 20, and thus it is possible to easily realize the configuration in which the upper end portion 51 of the connection member 50 is located on the downstream side in the tank direction TD with respect to the tip end portion 152 of the refueling nozzle 150. The connection member 50 is provided on the outer circumferential surface 27 of the flow path formation portion 26 which is formed so as to have a diameter smaller than the insertion portion 22, and thus it is possible to reduce an increase in the dimension of the nozzle guide 10 in the radial direction in order to provide the connection member 50. The connection member 50 and the main body portion 20 are integrally molded, and thus it is possible to reduce an increase in the number of manufacturing steps of the nozzle guide 10.

The connection member 50 is formed in the tank direction TD when seen from the accommodation portion 23. In other words, on the downstream side of the accommodation portion 23 whose dimension in the radial direction is greater than the dimensions of the other parts of the insertion portion 22, the connection member 50 is formed on the outer circumferential surface 27 of the flow path formation portion 26 which is formed so as to have a diameter smaller than the insertion portion 22. Hence, the connection member 50 is formed inward in the radial direction with respect to the accommodation portion 23, and thus it is possible to reduce an increase in the dimension of the nozzle guide 10 in the radial direction in order to provide the connection member 50. In other words, a dead space is utilized, and thus the connection member 50 is able to be arranged, with the result that it is possible to achieve space saving.

The angle formed by the direction in which the discharge flow path formation portion 56 is provided so as to extend and the tank direction TD is 0°, and thus it is possible to rectify the fuel vapor toward the tank direction TD so as to discharge the fuel vapor from the opening 57. Hence, it is possible to return the fuel vapor to the fuel tank FT so as to circulate it, and thus it is possible to reduce the flow of the fuel vapor out from the refueling port FC.

The breather pipe 120 is arranged within the filler pipe 110, and thus it is possible to reduce the complication of the structures of the fuel supply device 100 and the fuel tank FT. For example, it is possible to prevent an opening from being formed in the fuel tank FT in order to provide the breather pipe 120, and thus it is possible to reduce an increase in the number of manufacturing steps. For example, it is possible to omit a holding member for bundling the breather pipe 120 and the filler pipe 110 made of resin. Hence, it is possible to reduce an increase in the number of manufacturing steps of the fuel supply device 100 and the fuel tank FT, and thus it is possible to reduce an increase in the manufacturing cost. As compared with a configuration in which a breather pipe is provided outside a filler pipe, it is possible to reduce a decrease in the flexibility of arrangement, with the result that it is possible to enhance the mountability of the fuel supply device 100.

B. Second Embodiment

Figure 6:
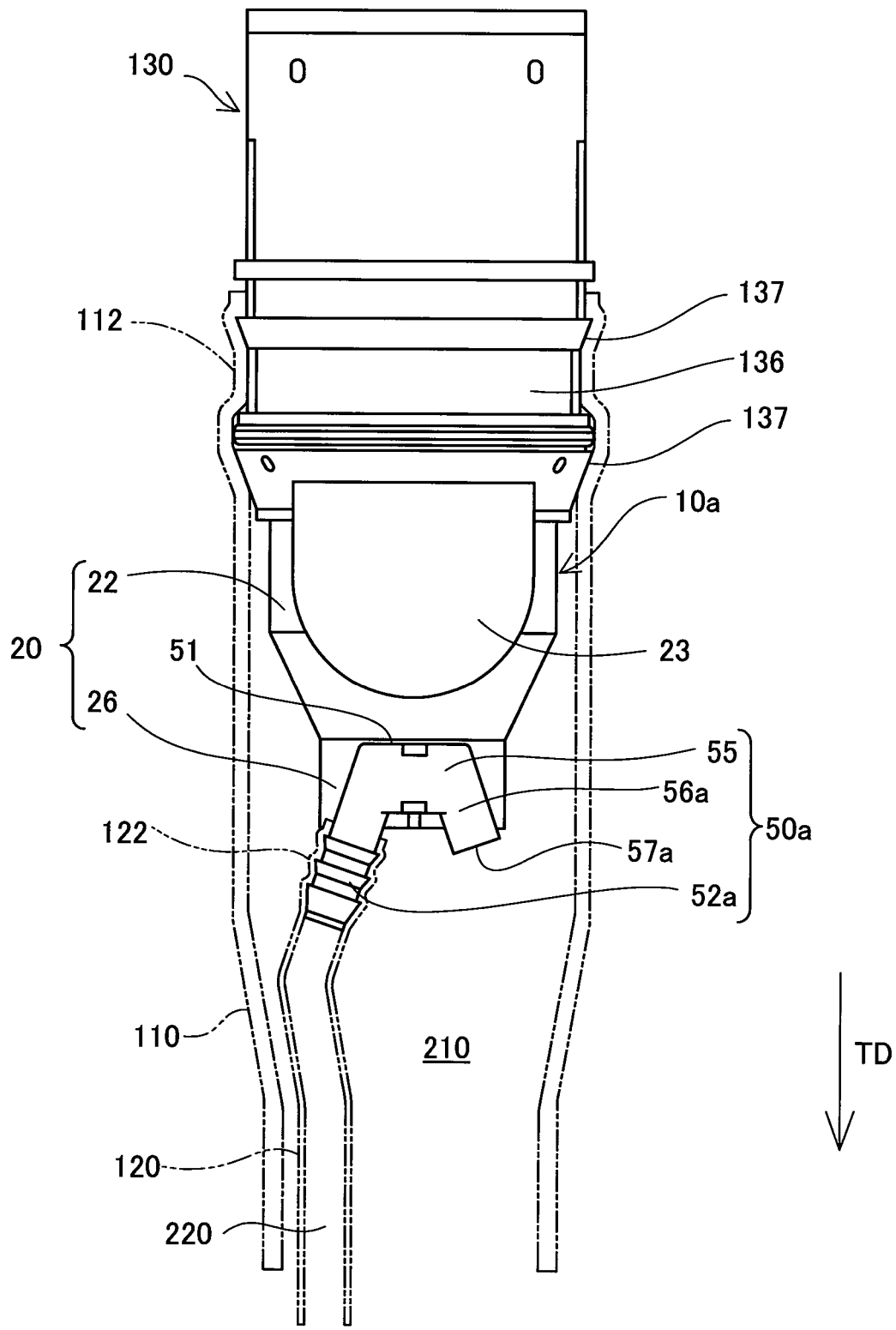
FIG. 6 is a front view showing a schematic configuration of a nozzle guide in a second embodiment.

FIG. 6 is a front view showing a schematic configuration of a nozzle guide 10a in a second embodiment. In FIG. 6, for convenience of description, the opening formation member 130, the filler pipe 110 and the breather pipe 120 are shown together with the nozzle guide 10a. The nozzle guide 10a of the second embodiment differs from the nozzle guide 10 of the first embodiment in that the nozzle guide 10a includes a connection member 50a instead of the connection member 50. Since the other configurations are the same as those of the nozzle guide 10 in the first embodiment, the same configurations are identified with the same symbols, and the detailed description thereof will be omitted.

The connection member 50a differs from the connection member 50 of the first embodiment in a direction in which a connection portion 52a is provided and in a direction in which a discharge flow path formation portion 56a is provided so as to extend. The connection member 50a has an external shape in which a pipe member is bent substantially in the shape of the letter V, and the connection portion 52a and the discharge flow path formation portion 56a are provided in such directions that as they are extended toward the tank direction TD, they are extended away from each other.

The connection portion 52a is formed along the direction intersecting the tank direction TD, and is formed such that an angle formed by the direction in which the connection portion 52a is provided and the tank direction TD is less than 90°. The discharge flow path formation portion 56a is formed along the direction intersecting the tank direction TD, and is formed such that an angle formed by the direction in which the discharge flow path formation portion 56a is provided so as to extend and the tank direction TD is less than 90°.

The fuel vapor which flows through the breather pipe 120 into the connection member 50a is discharged from the opening 57 formed in the discharge flow path formation portion 56a into the fuel flow path 210 within the filler pipe 110. Since the angle formed by the direction in which the discharge flow path formation portion 56a is provided so as to extend and the tank direction TD is less than 90°, the fuel vapor discharged from the opening 57 is made to flow in the tank direction TD together with the flow of the fuel discharged from the refueling nozzle 150 at the time of refueling.

In the nozzle guide 10a of the second embodiment described above, the same effects as in the nozzle guide 10 of the first embodiment are provided. Moreover, the connection portion 52a and the discharge flow path formation portion 56a are provided in such directions that as they are extended toward the tank direction TD, they are extended away from each other, and thus when the connection member 50a and the main body portion 20 are integrally molded by injection molding, it is possible to reduce the undercutting of the connection member 50a and to reduce the complication of a mold release step.

C. Third Embodiment

Figure 7:
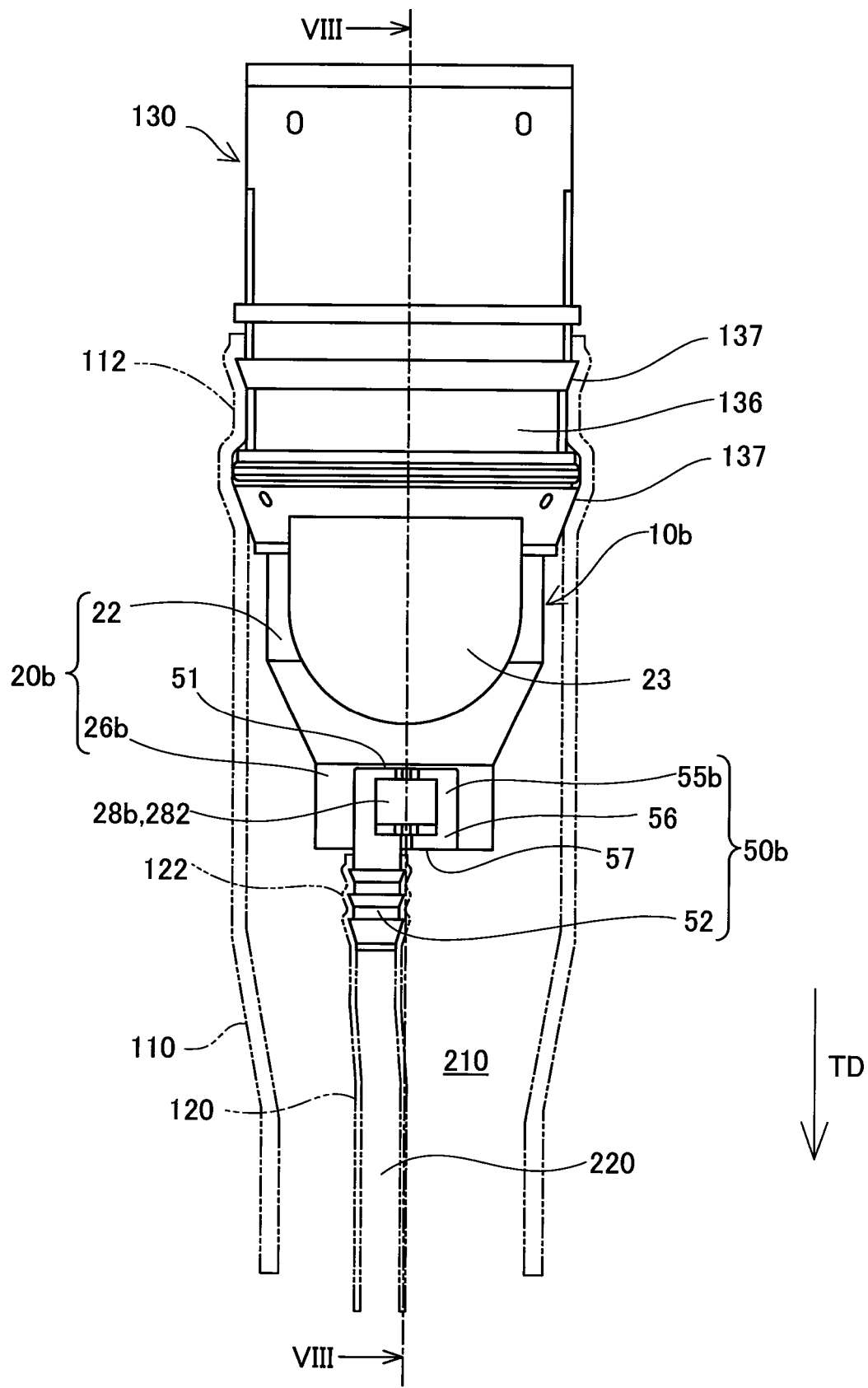
FIG. 7 is a front view showing the configurations of an opening formation member and a nozzle guide in a third embodiment.
Figure 8:
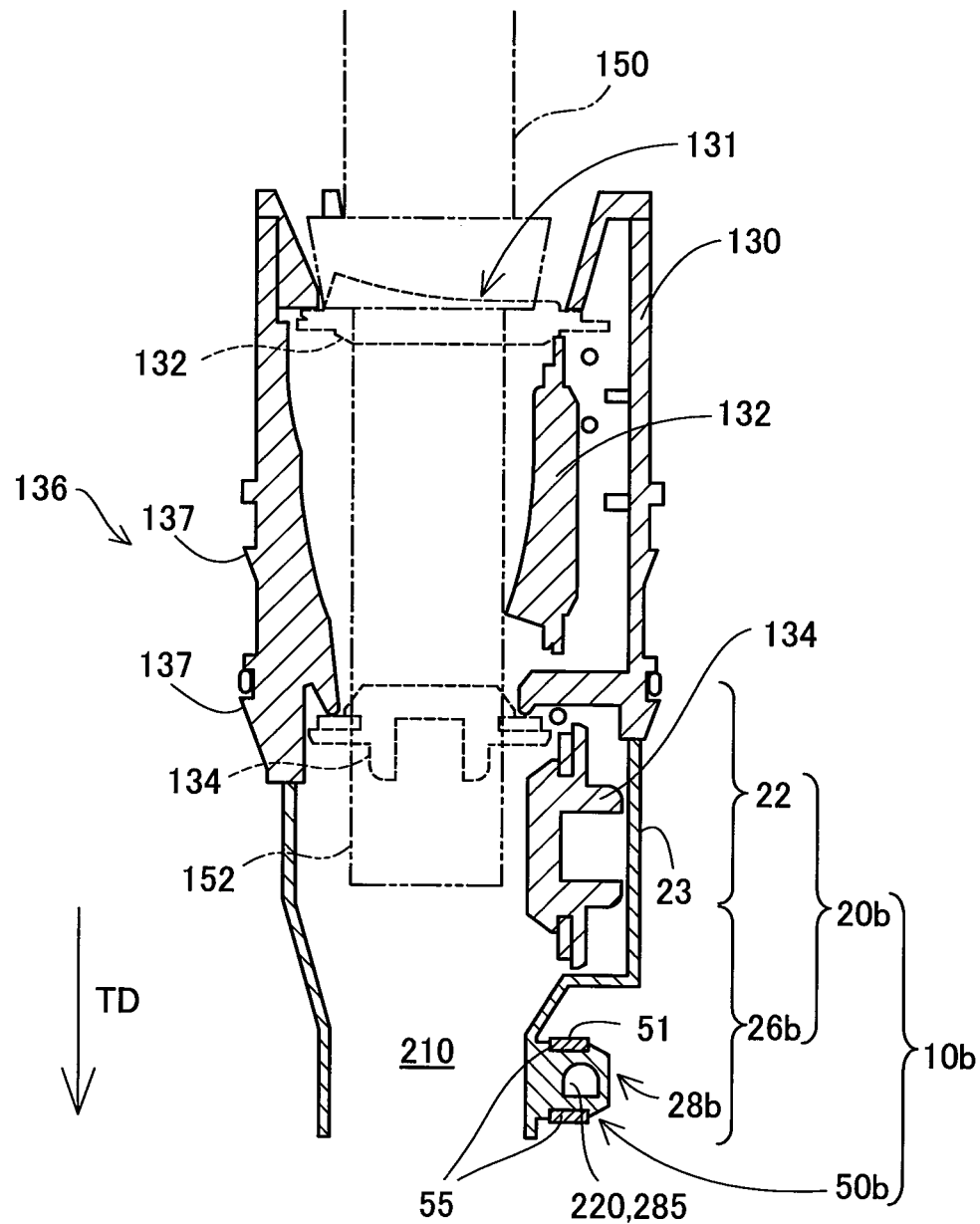
FIG. 8 is a cross-sectional view showing a cross section taken along the line VIII-VIII of FIG. 7.

FIG. 7 is a front view showing the configurations of the opening formation member 130 and a nozzle guide 10b. FIG. 7 corresponds to a diagram similar to the diagram which is seen from the arrow A in FIG. 1. In FIG. 7, for convenience of illustration, the upstream end 112 of the filler pipe 110 and the upstream end 122 of the breather pipe 120 are indicated by chain double-dashed lines. FIG. 8 is a cross-sectional view showing a cross section taken along the line VIII-VIII of FIG. 7. In FIG. 8, for convenience of illustration, the position of the refueling nozzle 150 at the time of refueling is indicated by chain double-dashed lines, and the lid member 132 and the opening/closing member 134 in the closed state are indicated by broken lines. In FIG. 8, the illustration of the filler pipe 110 and the breather pipe 120 is omitted.

Figure 9:
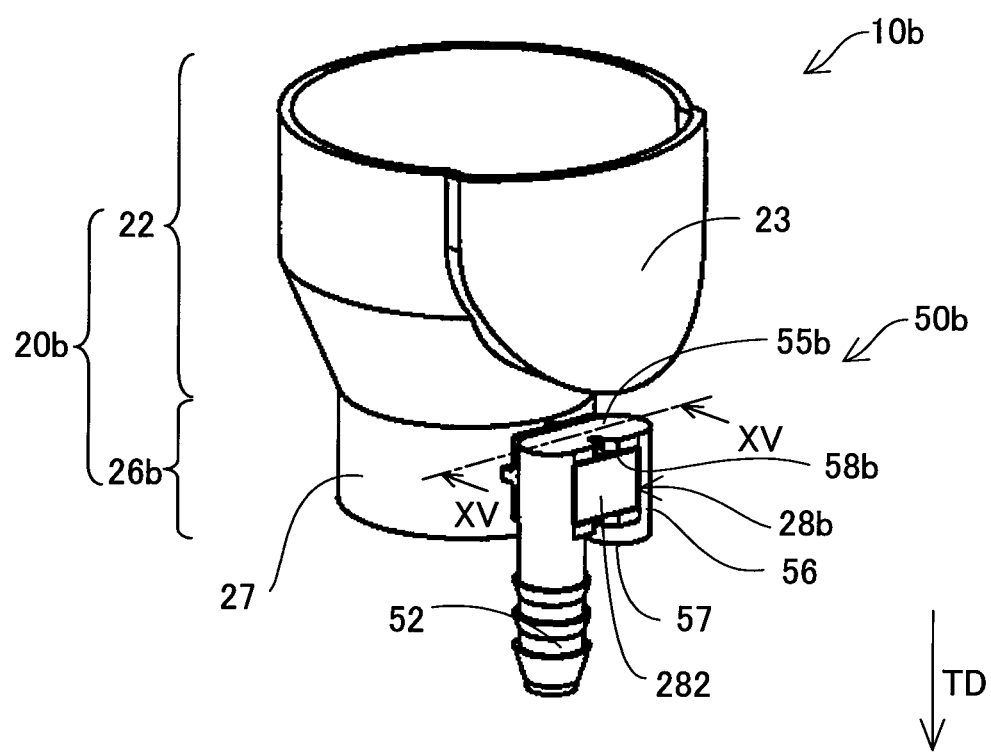
FIG. 9 is a perspective view showing a schematic configuration of the nozzle guide in the third embodiment.
Figure 10:
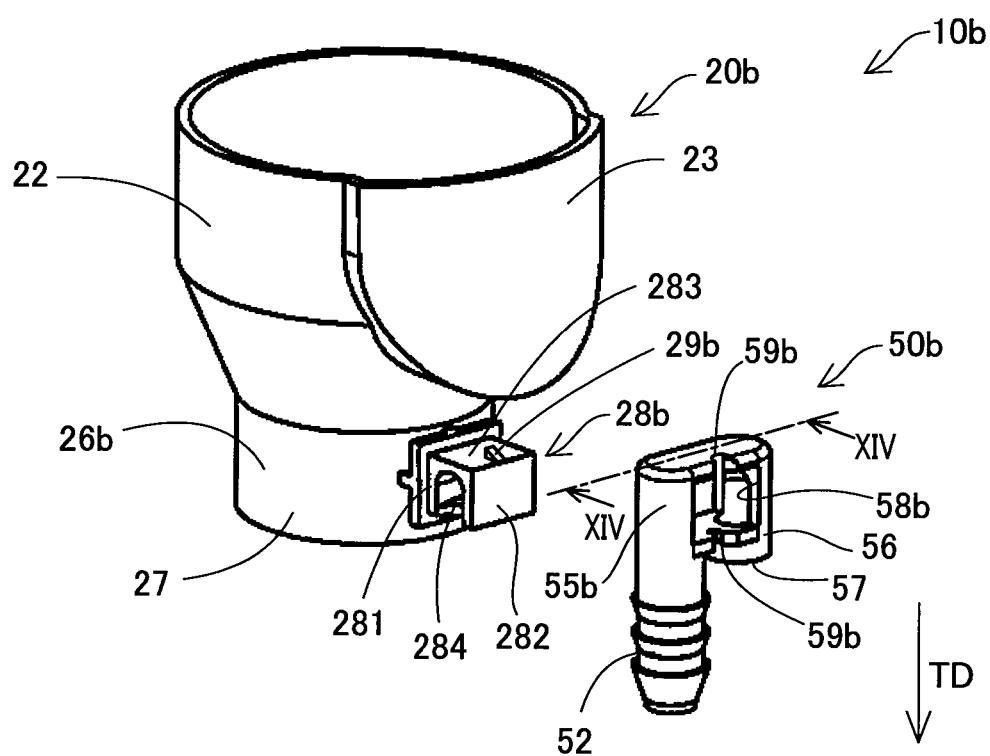
FIG. 10 is an exploded perspective view showing the nozzle guide in the third embodiment which is disassembled.

FIG. 9 is a perspective view showing a schematic configuration of the nozzle guide 10b in the third embodiment. FIG. 10 is an exploded perspective view showing the nozzle guide 10b in the third embodiment which is disassembled. The nozzle guide 10b of the third embodiment differs from the nozzle guide 10 of the first embodiment in that the nozzle guide 10b includes, instead of the main body portion 20 and the connection member 50, a main body portion 20b and a connection member 50b which are formed as separate members. Since the other configurations are the same as those of the nozzle guide 10 in the first embodiment, the same configurations are identified with the same symbols, and the detailed description thereof will be omitted.

Figure 11:
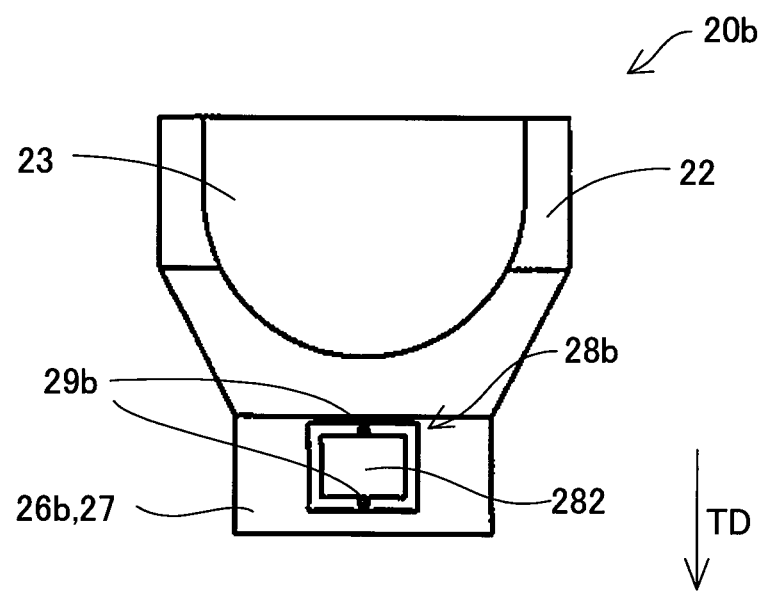
FIG. 11 is a front view showing a schematic configuration of a main body portion.
Figure 12:
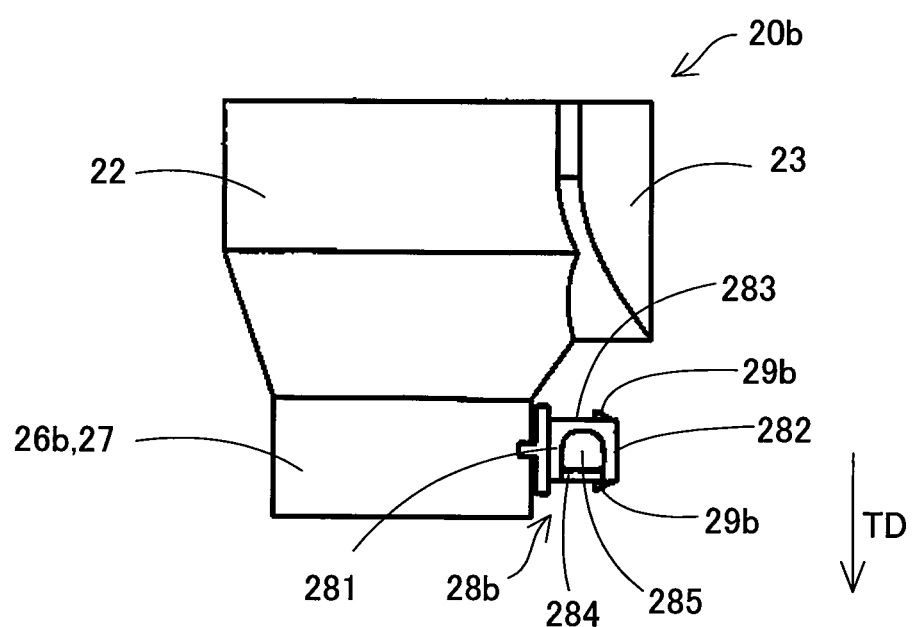
FIG. 12 is a side view showing a schematic configuration of the main body portion.

FIG. 11 is a front view showing a schematic configuration of the main body portion 20b. FIG. 12 is a side view showing a schematic configuration of the main body portion 20b. As shown in FIGS. 10 to 12, the main body portion 20b includes an engagement portion 28b on the outer circumferential surface 27 of a flow path formation portion 26b. The engagement portion 28b has an external shape which is formed so as to protrude outward in the radial direction and which is formed substantially in the shape of a rectangular parallelepiped. As shown in FIGS. 11 and 12, in the engagement portion 28b, two engagement protrusions 29b are formed. The engagement protrusions 29b are respectively formed on the upstream side and the downstream side of the engagement portion 28b in the tank direction TD. The engagement protrusions 29b are respectively formed on end portions of the engagement portion 28b outward in the radial direction. The engagement protrusions 29b respectively engage with engagement groove portions 59b which will be described later.

As shown in FIGS. 10 and 12, the engagement portion 28b includes a first flow path wall 281, a second flow path wall 282, a third flow path wall 283 and a fourth flow path wall 284. The first flow path wall 281 is formed in contact with the outer circumferential surface 27 of the flow path formation portion 26b along the tank direction TD. The second flow path wall 282 is formed parallel to the first flow path wall 281 only a predetermined distance apart therefrom in the radial direction. The third flow path wall 283 configures a ceiling part of the engagement portion 28b, communicates with end portions of the first flow path wall 281 and the second flow path wall 282 on the upstream side in the tank direction TD and is formed along the radial direction. The fourth flow path wall 284 configures a bottom part of the engagement portion 28b, communicates with center portions of end portions of the first flow path wall 281 and the second flow path wall 282 on the downstream side in the tank direction TD and is formed parallel to the third flow path wall 283 only a predetermined distance apart therefrom in the radial direction. Within the engagement portion 28b, a communication hole 285 is formed along a direction perpendicular to the tank direction TD and the radial direction by being surrounded with the first flow path wall 281, the second flow path wall 282, the third flow path wall 283 and the fourth flow path wall 284. The communication hole 285 functions as part of the vapor flow path 220 for the fuel vapor. In other words, the flow path walls 281 to 284 form part of the vapor flow path 220.

Figure 13:
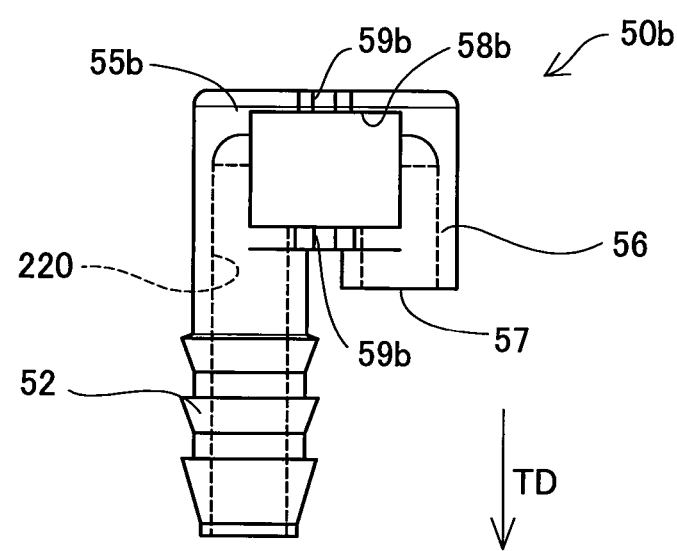
FIG. 13 is a front view showing a schematic configuration of a connection member.
Figure 14:
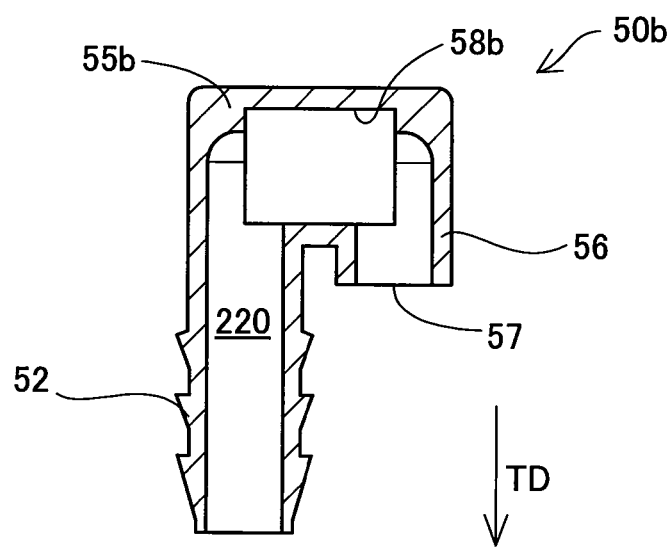
FIG. 14 is a cross-sectional view showing a cross section taken along the line XIV-XIV of FIG. 10.

FIG. 13 is a front view showing a schematic configuration of the connection member 50b. FIG. 14 is a cross-sectional view showing a cross section taken along the line XIV-XIV of FIG. 10. In FIG. 13, for convenience of description, the vapor flow path 220 is indicated by broken lines.

As shown in FIGS. 10, 13 and 14, the connection member 50b includes an engaged portion 58b which engages with the engagement portion 28b of the main body portion 20b. The engaged portion 58b is formed by hollowing out part of a vapor flow path formation portion 55b in the connection member 50b in the shape of a rectangular parallelepiped, and is formed as a through hole which penetrates the connection member 50b along the radial direction of the main body portion 20b.

As shown in FIGS. 10 and 13, in the engaged portion 58b, the two engagement groove portions 59b are formed. In the engaged portion 58b, the engagement groove portions 59b are respectively formed on the upstream side and the downstream side in the tank direction TD. The engagement groove portions 59b respectively engage with the engagement protrusions 29b which are formed in the engagement portion 28b of the main body portion 20b.

As shown in FIG. 9, the engagement portion 28b of the main body portion 20b is inserted into the engaged portion 58b, the engagement protrusions 29b engage with the engagement groove portions 59b and thus the connection member 50b engages with the main body portion 20b so as to be fixed thereto. The second flow path wall 282 of the connection member 50b forms an external wall surface of the nozzle guide 10b in a state where the connection member 50b engages with the main body portion 20b so as to be fixed thereto. The third flow path wall 283 and the fourth flow path wall 284 of the connection member 50b are overlaid on the inside surfaces of the vapor flow path formation portion 55b in the state where the connection member 50b engages with the main body portion 20b so as to be fixed thereto.

Figure 15:
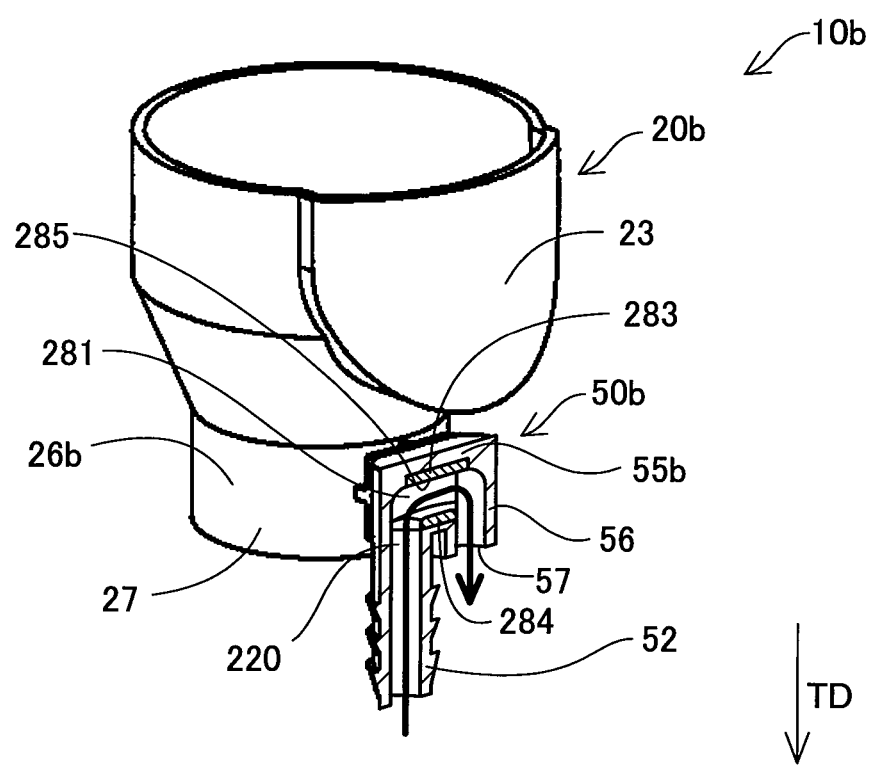
FIG. 15 is a partial cross-sectional view illustrating the configuration of a vapor flow path.

FIG. 15 is a partial cross-sectional view illustrating the configuration of the vapor flow path 220. FIG. 15 shows, in a perspective view similar to FIG. 9, a cross section of the connection member 50*b* taken along the line VX-VX shown in FIG. 9. In FIG. 15, as indicated by a thick arrow, the fuel vapor is passed through the communication hole 285 formed by being surrounded with the flow path walls 281 to 284 so as to flow within the vapor flow path formation portion 55*b*. In the cross section shown in FIG. 15, the second flow path wall 282 does not appear. As described above, part of the vapor flow path 220 in the present embodiment is formed with the vapor flow path formation portion 55*b* and the engagement portion 28*b*.

The assembly of the breather pipe 120 to the nozzle guide 10*b* may be realized by press-fitting the connection portion 52 of the connection member 50*b* into the upstream end 122 of the breather pipe 120 and thereafter making the engagement portion 28*b* of the main body portion 20*b* and the engaged portion 58*b* of the connection member 50*b* engage with each other such that they are fixed to each other.

In the nozzle guide 10*b* of the third embodiment described above, the same effects as in the nozzle guide 10 of the first embodiment are provided. Moreover, the main body portion 20*b* includes the engagement portion 28*b* on the outer circumferential surface 27 of the flow path formation portion 26*b*, the connection member 50*b* includes the engaged portion 58*b*, the main body portion 20*b* and the connection member 50*b* are molded as separate members and the main body portion 20*b* and the connection member 50*b* engage with each other so as to be fixed to each other with the engagement portion 28*b* and the engaged portion 58*b*. Hence, it is possible to mold the main body portion 20*b* and the connection member 50*b* as separate members by injection molding or the like and to easily fix the main body portion 20*b* and the connection member 50*b* to each other. For example, as compared with a configuration in which the connection member 50*b* is fixed to the main body portion 20*b* by welding or the like, it is possible to reduce the complication of the manufacturing steps of the nozzle guide 10*b*. It is possible to provide the connection member 50*b* on the outer circumferential surface of the nozzle guide 10*b* by engagement fixing, and thus after the connection portion 52 of the connection member 50*b* is press-fitted into the upstream end 122 of the breather pipe 120, it is possible to integrate the connection member 50*b* with the main body portion 20*b*. Hence, it is possible to enhance the assembly of the breather pipe 120 more. It is possible to realize the configuration in which the discharge flow path formation portion 56 is formed along the tank direction TD with the omission of undercutting processing, and thus it is possible to reduce an increase in the cost necessary for manufacturing the nozzle guide 10*b*.

The engagement portion 28*b* formed on the main body portion 20*b* configures the flow path walls 281 to 284 which form part of the vapor flow path 220, and the second flow path wall 282 configures the outer wall surface of the nozzle guide 10*b*. Hence, it is possible to achieve, with the engagement portion 28*b*, both the function of fixing the connection member 50*b* to the main body portion 20*b* and the function of forming part of the vapor flow path 220. In the vapor flow path formation portion 55*b* of the connection member 50*b*, part of the flow path walls for forming the vapor flow path 220 is able to be omitted, and thus it is possible to reduce an increase in the size of the connection member 50*b* and to reduce the material cost of the connection member 50*b*.

D. Fourth Embodiment

Figure 16:
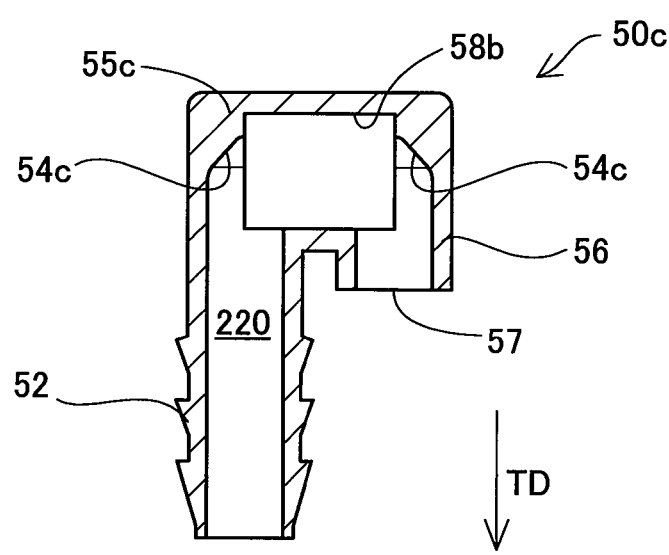
FIG. 16 is a cross-sectional view showing the configuration of a connection member in a fourth embodiment.

FIG. 16 is a cross-sectional view showing the configuration of a connection member 50*c* included in the nozzle guide of a fourth embodiment. FIG. 16 shows a cross section similar to FIG. 14. The connection member 50*c* included in the nozzle guide of the fourth embodiment differs from the connection member 50*b* included in the nozzle guide 10*b* of the third embodiment in that two guide portions 54*c* are further formed. Since the other configurations are the same as those of the connection member 50*b* in the third embodiment, the same configurations are identified with the same symbols, and the detailed description thereof will be omitted.

In the vapor flow path 220 formed in a vapor flow path formation portion 55*c*, the two guide portions 54*c* are formed as slope-shaped parts which fill in corner portions on the upstream side in the tank direction TD. The guide portions 54*c* individually guide the flow of the fuel vapor so as to reduce a turbulence which may occur in the corner portions of the vapor flow path 220, and thereby reduce a pressure loss so as to facilitate the circulation of the fuel vapor.

In the nozzle guide including the connection member 50*c* in the fourth embodiment described above, the same effects as in the nozzle guide 10*b* of the third embodiment are provided. Moreover, in the connection member 50*c*, the guide portions 54*c* are formed which guide the flow of the fuel vapor, and thus it is possible to reduce a pressure loss so as to smooth the flow of the fuel vapor more, with the result that it is possible to facilitate the circulation of the fuel vapor more.

E. Fifth Embodiment

Figure 17:
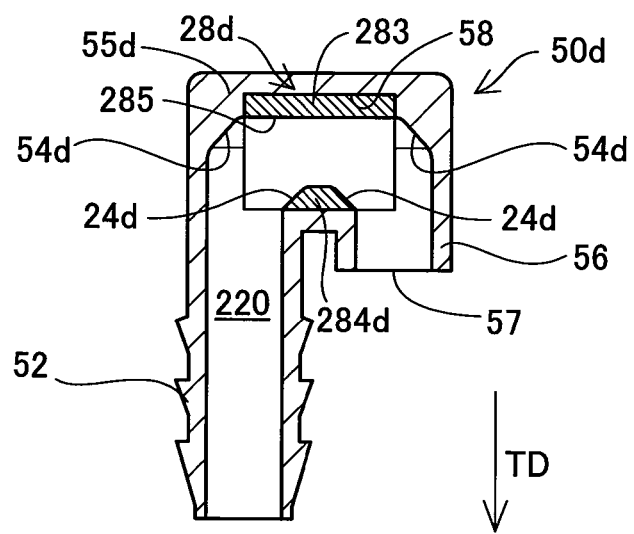
FIG. 17 is a partial cross-sectional view showing the configuration of a main portion of a nozzle guide in a fifth embodiment.

FIG. 17 is a partial cross-sectional view showing the configuration of a main portion of a nozzle guide in a fifth embodiment. FIG. 17 shows a cross section similar to the cross section shown in FIG. 16. The nozzle guide of the fifth embodiment differs from the nozzle guide 10 of the first embodiment in that the nozzle guide of the fifth embodiment includes, instead of the connection member 50 and the engagement portion 28, a connection member 50*d* and an engagement portion 28*d*. Since the other configurations are the same as those of the nozzle guide 10 in the first embodiment, the same configurations are identified with the same symbols, and the detailed description thereof will be omitted.

In the connection member 50*d*, the two guide portions 54*d* are formed. In the vapor flow path 220 formed in a vapor flow path formation portion 55*d*, the two guide portions 54*d* are formed as slope-shaped parts which fill in corner portions on the upstream side in the tank direction TD. The guide portions 54*d* individually guide the flow of the fuel vapor so as to reduce a turbulence which may occur in the corner portions of the vapor flow path 220, and thereby reduce a pressure loss so as to facilitate the circulation of the fuel vapor.

In the engagement portion 28*d*, two guide portions 24*d* are formed. In a fourth flow path wall 284*d*, the two guide portions 24*d* are formed as slope-shaped parts in which corner portions on the upstream side in the tank direction TD are cut away. The guide portions 24*d* individually guide the flow of the fuel vapor so as to reduce a turbulence which may occur in the corner portions of the vapor flow path 220, and thereby reduce a pressure loss so as to facilitate the circulation of the fuel vapor.

In the nozzle guide of the fifth embodiment described above, the same effects as in the nozzle guide 10 of the first embodiment are provided. Moreover, in the connection member 50*d* and the fourth flow path wall 284*d* of the engagement portion 28d, the guide portions 54d and 24d are formed which individually guide the flow of the fuel vapor, and thus it is possible to reduce a pressure loss so as to smooth the flow of the fuel vapor more, with the result that it is possible to facilitate the circulation of the fuel vapor more.

F. Sixth Embodiment

Figure 18:
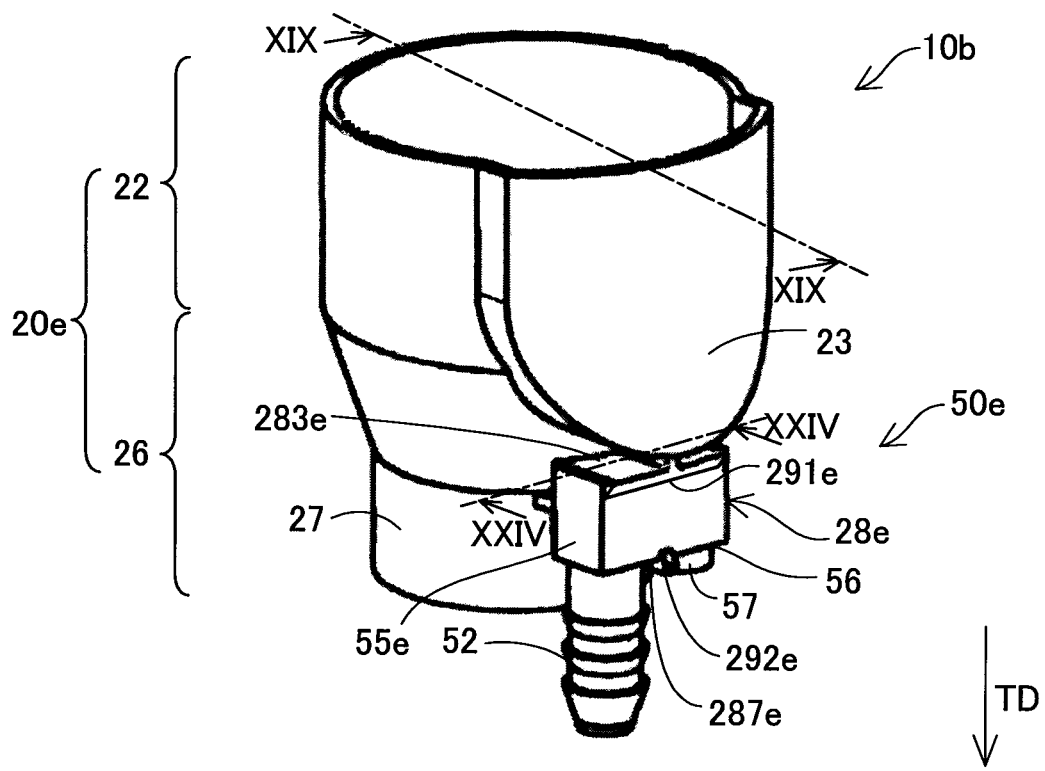
FIG. 18 is a perspective view showing a schematic configuration of a nozzle guide in a sixth embodiment.
Figure 19:
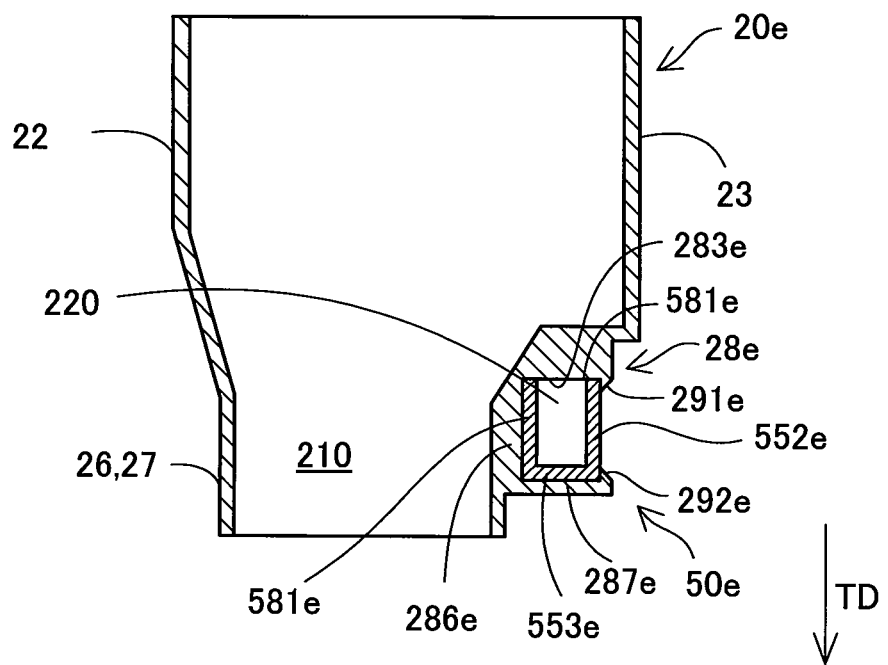
FIG. 19 is a cross-sectional view showing a cross section taken along the line XIX-XIX of FIG. 12.
Figure 20:
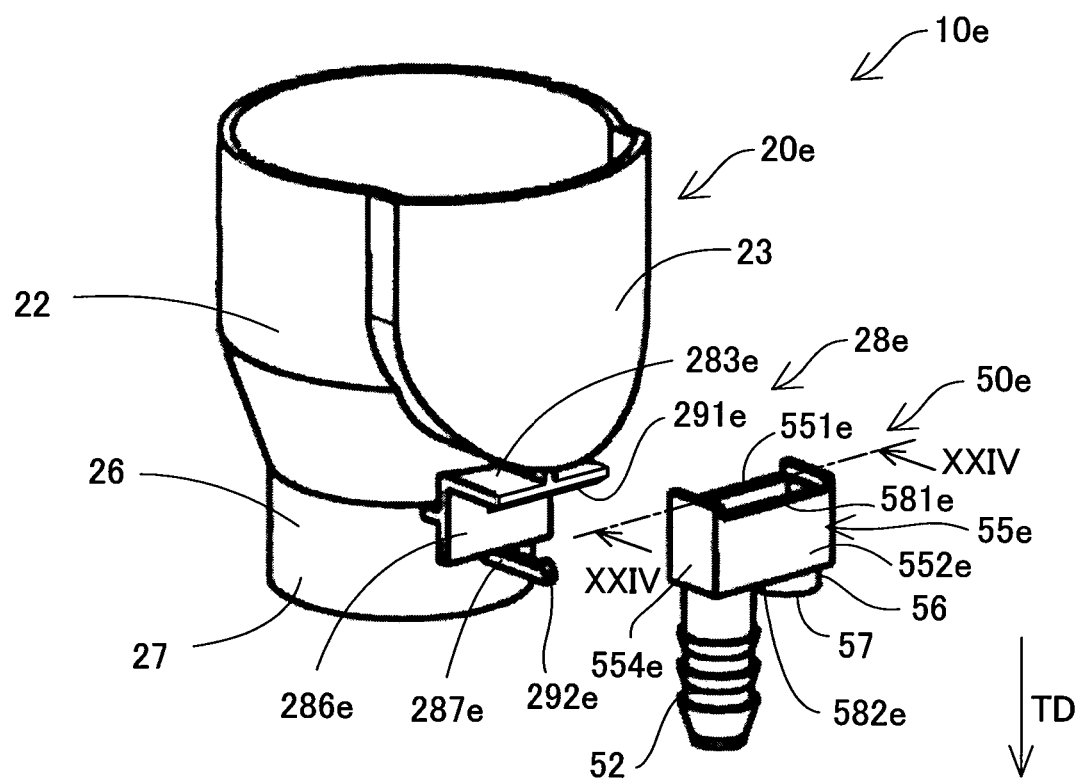
FIG. 20 is an exploded perspective view showing the nozzle guide in the sixth embodiment which is disassembled.

FIG. 18 is a perspective view showing a schematic configuration of a nozzle guide 10e in a sixth embodiment. FIG. 19 is a cross-sectional view showing a cross section taken along the line XIX-XIX of FIG. 18. FIG. 20 is an exploded perspective view showing the nozzle guide 10e in the sixth embodiment which is disassembled. The nozzle guide 10e of the sixth embodiment differs from the nozzle guide 10 of the first embodiment in that the nozzle guide 10e includes, instead of the main body portion 20 and the connection member 50, a main body portion 20e and a connection member 50e. Since the other configurations are the same as those of the nozzle guide 10 in the first embodiment, the same configurations are identified with the same symbols, and the detailed description thereof will be omitted.

Figure 21:
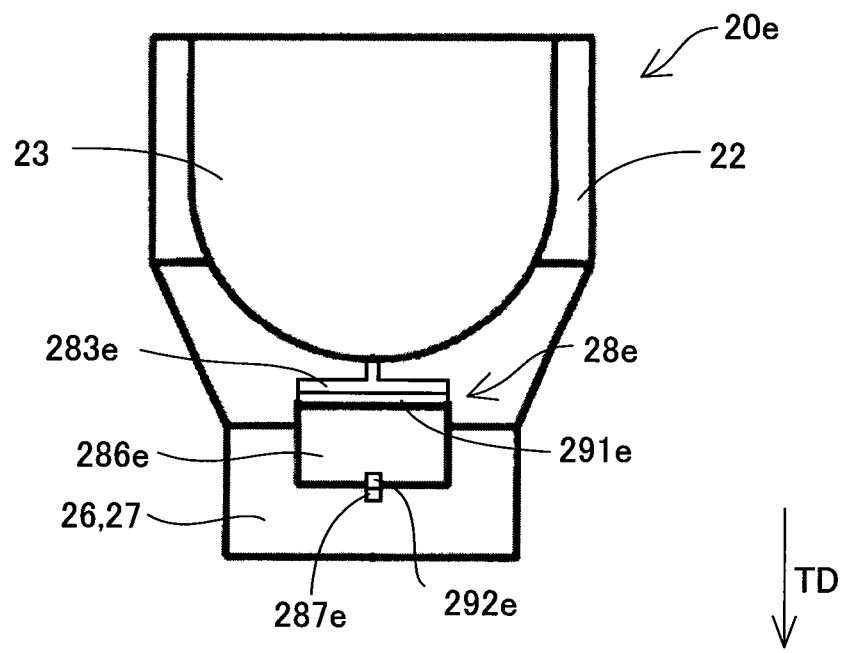
FIG. 21 is a front view showing a schematic configuration of a main body portion in the sixth embodiment.
Figure 22:
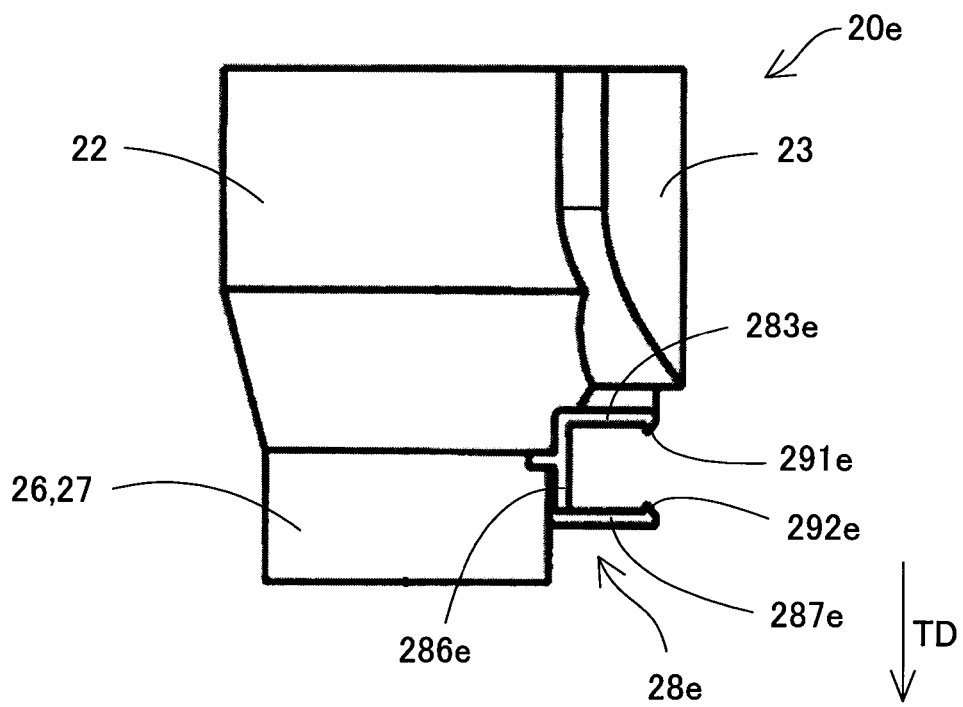
FIG. 22 is a side view showing a schematic configuration of the main body portion in the sixth embodiment.

FIG. 21 is a front view showing a schematic configuration of the main body portion 20e. FIG. 22 is a side view showing a schematic configuration of the main body portion 20e. The main body portion 20e includes an engagement portion 28e instead of the engagement portion 28. As shown in FIGS. 19 to 22, the engagement portion 28e includes a first wall portion 286e, a third flow path wall 283e, a support portion 287e, a first engagement protrusion 291e and a second engagement protrusion 292e.

The first wall portion 286e is formed in the position in which the first flow path wall 281 is formed in the engagement portion 28 of the first embodiment, and is formed in contact with the outer circumferential surface 27 of the flow path formation portion 26 along the tank direction TD. The third flow path wall 283e has an external shape which is formed substantially in the shape of a flat plate, and configures a ceiling part of the engagement portion 28e. The third flow path wall 283e communicates with an end portion of the first wall portion 286b on the upstream side in the tank direction TD, and is formed along the radial direction. The support portion 287e has an external shape which is formed substantially in the shape of a rod, and is formed in the position in which the fourth flow path wall 284 is formed in the engagement portion 28 of the first embodiment. The support portion 287e communicates with an end portion of the first wall portion 286e on the downstream side, and is formed along the radial direction. The support portion 287e supports the connection member 50e.

The first engagement protrusion 291e is formed on an end portion of the third flow path wall 283e outward in the radial direction so as to protrude toward the downstream side in the tank direction TD. The first engagement protrusion 291e engages with a first engaged portion 581e which will be described later. The second engagement protrusion 292e is formed on an end portion of the support portion 287e outward in the radial direction so as to protrude toward the upstream side in the tank direction TD. The second engagement protrusion 292e engages with a second engaged portion 582e which will be described later.

Figure 23:
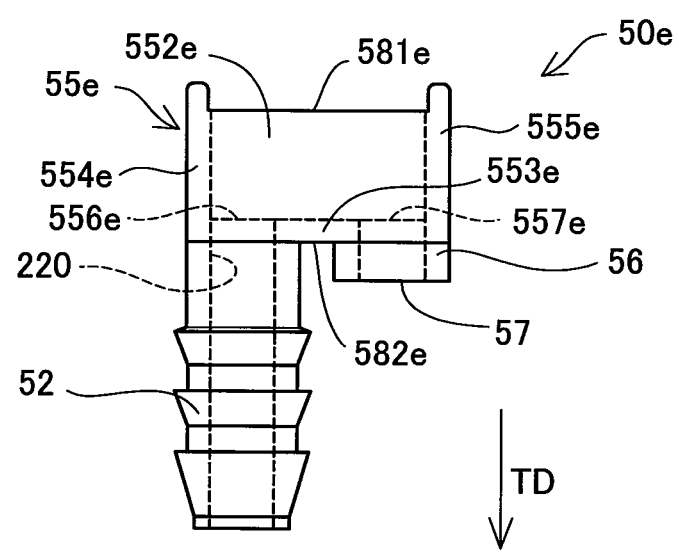
FIG. 23 is a front view showing a schematic configuration of a connection member in the sixth embodiment.
Figure 24:
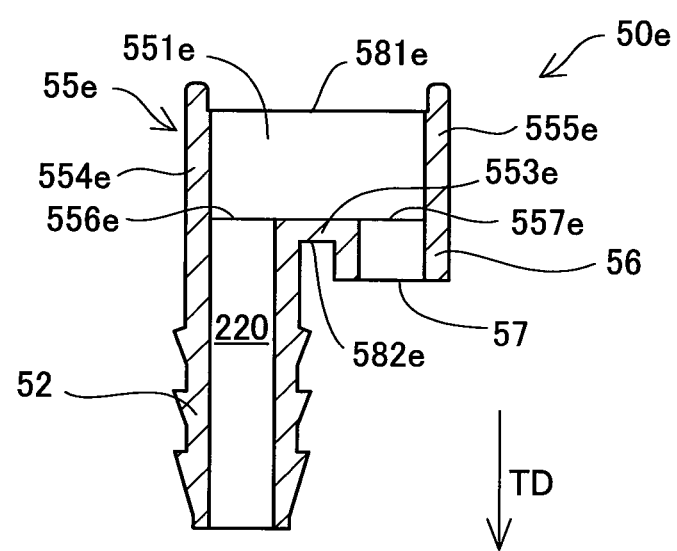
FIG. 24 is a cross-sectional view showing a cross section taken along the line XXIV-XXIV of FIG. 20.

FIG. 23 is a front view showing a schematic configuration of the connection member 50e. FIG. 24 is a cross-sectional view showing a cross section taken along the line XXIV-XXIV of FIG. 20. In FIG. 23, for convenience of description, the vapor flow path 220 is indicated by broken lines.

As shown in FIGS. 20, 23 and 24, the connection member 50e includes the connection portion 52, a vapor flow path formation portion 55e, the discharge flow path formation portion 56, the first engaged portion 581e and the second engaged portion 582e.

In a state where the connection member 50e engages with the main body portion 20e so as to be fixed thereto, the vapor flow path formation portion 55e communicates with the breather pipe 120 through the connection portion 52, and forms part of the vapor flow path 220 for the fuel vapor that flows in through the breather pipe 120 and the connection portion 52. The vapor flow path formation portion 55e has an external shape which is formed substantially in the shape of a hollow rectangular parallelepiped with the omission of a ceiling part, and includes a fifth flow path wall 551e, a sixth flow path wall 552e, a seventh flow path wall 553e, an eighth flow path wall 554e and a ninth flow path wall 555e.

The fifth flow path wall 551e shown in FIGS. 19 and 20 is formed along the tank direction TD, and is in contact with the first wall portion 286e in a state where the connection member 50e engages with the main body portion 20e so as to be fixed thereto. The sixth flow path wall 552e shown in FIGS. 19, 20 and 23 is formed parallel to the fifth flow path wall 551e only a predetermined distance apart therefrom in the radial direction. The seventh flow path wall 553e shown in FIGS. 19, 23 and 24 configures a bottom part of the vapor flow path formation portion 55e, communicates with both end portions of the fifth flow path wall 551e and the sixth flow path wall 552e on the downstream side in the tank direction TD and is formed along the radial direction. As shown in FIGS. 23 and 24, in the seventh flow path wall 553e, a first through hole 556e and a second through hole 557e which penetrate in the tank direction TD are formed side by side. The connection portion 52 communicates with the seventh flow path wall 553e through the first through hole 556e, and the discharge flow path formation portion 56 communicates with the seventh flow path wall 553e through the second through hole 557e. The eighth flow path wall 554e and the ninth flow path wall 555e configure side surface parts of the vapor flow path formation portion 55e, and are formed parallel to each other only a predetermined distance apart from each other. The eighth flow path wall 554e and the ninth flow path wall 555e individually communicate with the fifth flow path wall 551e, the sixth flow path wall 552e and the seventh flow path wall 553e, and are formed along the tank direction TD.

The first engaged portion 581e shown in FIGS. 19, 23 and 24 is formed in an end portion of the connection member 50e on the upstream side. The first engaged portion 581e is formed such that end portions of the fifth flow path wall 551e and the sixth flow path wall 552e on the upstream side are located on the downstream side in the tank direction TD with respect to end portions of the eighth flow path wall 554e and the ninth flow path wall 555e on the upstream side. In the configuration described above, the first engaged portion 581e engages with the first engagement protrusion 291e formed in the engagement portion 28e of the main body portion 20e.

The second engaged portion 582e shown in FIGS. 23 and 24 is formed in a center portion of the bottom part of the vapor flow path formation portion 55e in the connection member 50e, and is sandwiched between the connection portion 52 and the discharge flow path formation portion 56. The support portion 287e of the engagement portion 28e is inserted between the connection portion 52 and the discharge flow path formation portion 56, and thus the second engagement protrusion 292e is caught in the sixth flow path wall 552e, with the result that the second engaged portion 582e engages with the second engagement protrusion 292e.

Figure 25:
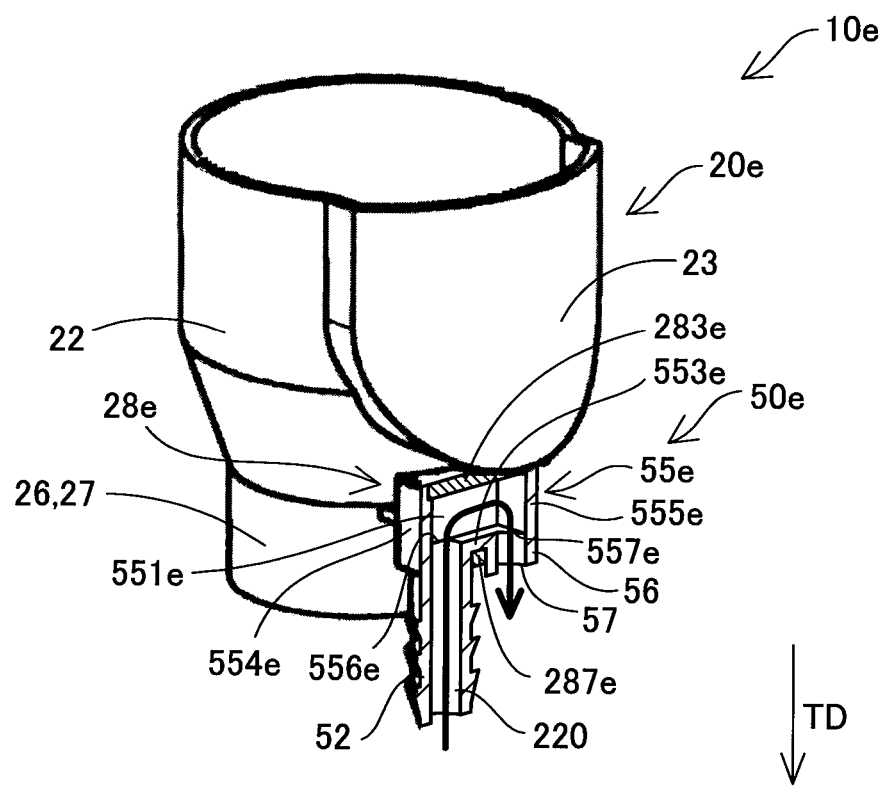
FIG. 25 is a partial cross-sectional view illustrating the configuration of a vapor flow path in the sixth embodiment.

FIG. 25 is a partial cross-sectional view illustrating the configuration of the vapor flow path 220 in the sixth embodiment. FIG. 25 shows, in a perspective view similar to FIG. 18, a cross section of the nozzle guide 10e taken along the line XXIV-XXIV shown in FIG. 18. As indicated by a thick arrow in FIG. 25, the fuel vapor flows into the vapor flow path formation portion 55e from the connection portion 52 through the first through hole 556e, and flows through a space surrounded by the fifth flow path wall 551e to the ninth flow path wall 555e of the connection member 50e and the third flow path wall 283e of the engagement portion 28e. Thereafter, the fuel vapor flows through the second through hole 557e to the discharge flow path formation portion 56 and is discharged from the opening 57 to the unillustrated fuel flow path 210. In the cross section shown in FIG. 25, the sixth flow path wall 552e of the connection member 50e does not appear. As described above, part of the vapor flow path 220 in the present embodiment is formed with part of the engagement portion 28e and the vapor flow path formation portion 55e.

In the nozzle guide 10e of the sixth embodiment described above, the same effects as in the nozzle guide 10 of the first embodiment are provided. Moreover, it is possible to reduce the complication of the configurations of the engagement portion 28e and the connection member 50e.

G. Seventh Embodiment

Figure 26:
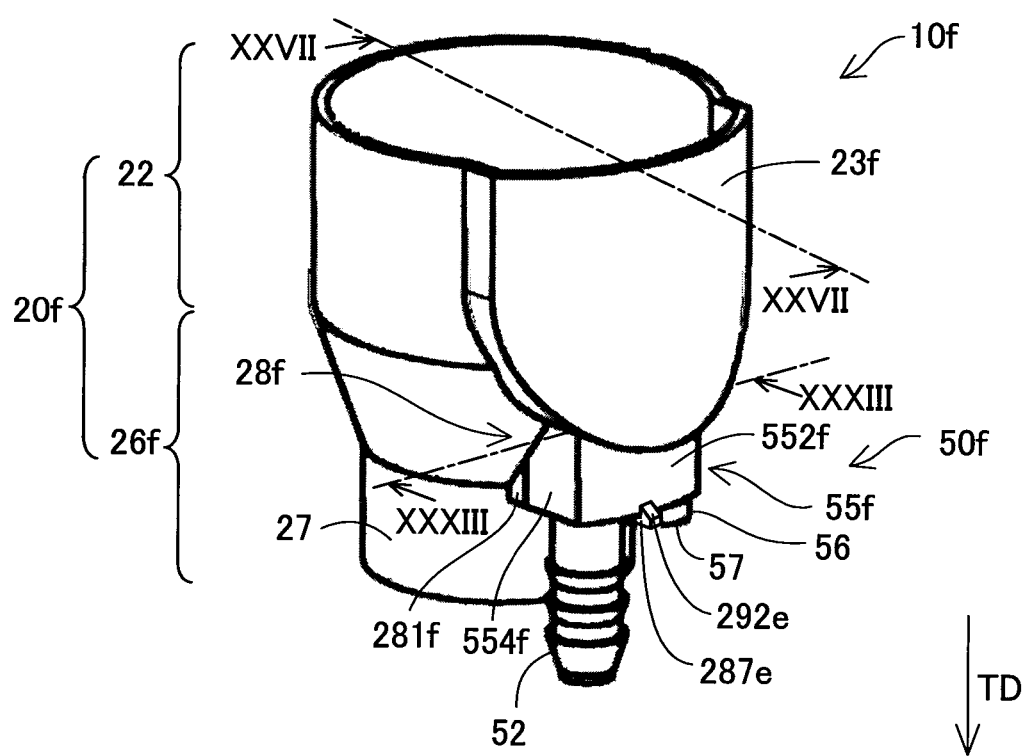
FIG. 26 is a perspective view showing a schematic configuration of a nozzle guide in a seventh embodiment.
Figure 27:
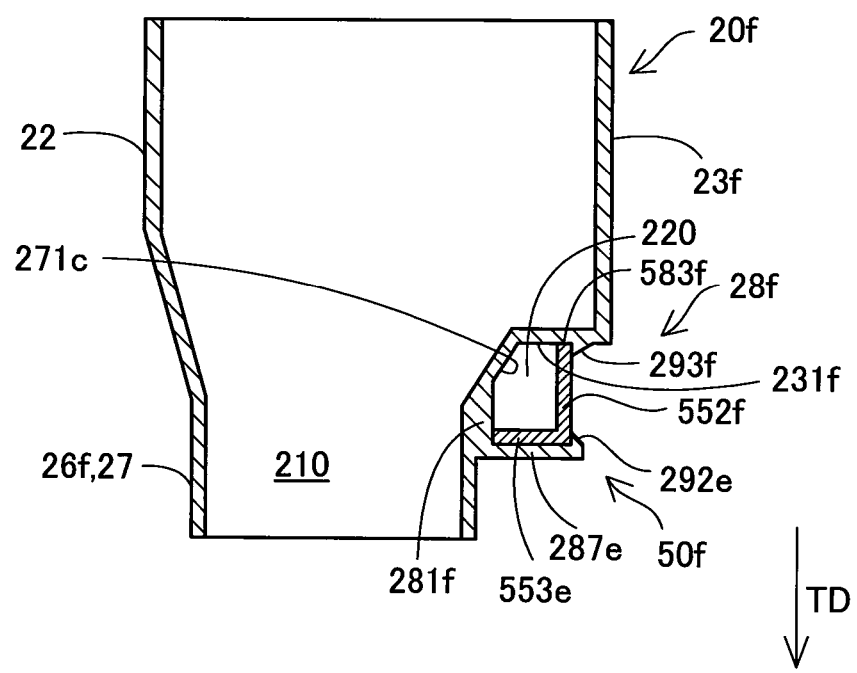
FIG. 27 is a cross-sectional view showing a cross section taken along the line XXVII-XXVII of FIG. 26.
Figure 28:
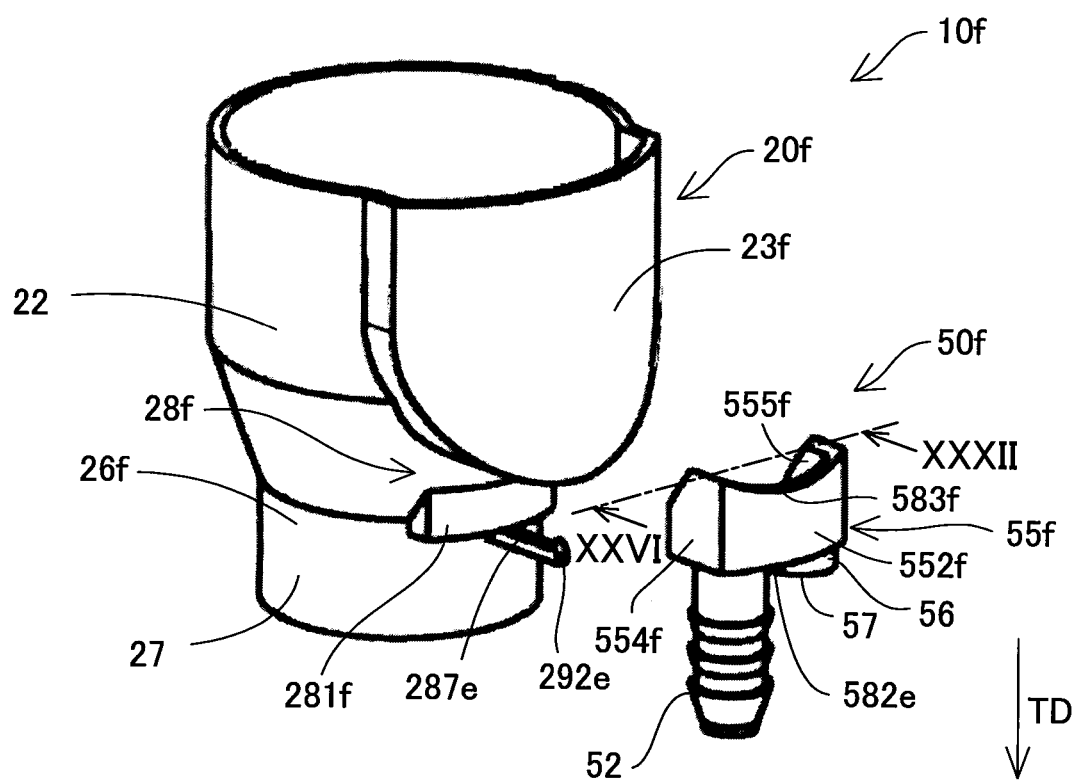
FIG. 28 is an exploded perspective view showing the nozzle guide in the seventh embodiment which is disassembled.

FIG. 26 is a perspective view showing a schematic configuration of a nozzle guide 10f in a seventh embodiment. FIG. 27 is a cross-sectional view showing a cross section taken along the line XXVII-XXVII of FIG. 26. FIG. 28 is an exploded perspective view showing the nozzle guide 10f in the seventh embodiment which is disassembled. The nozzle guide 10f of the seventh embodiment differs from the nozzle guide 10e of the sixth embodiment in that the nozzle guide 10f includes, instead of the main body portion 20e and the connection member 50e, a main body portion 20f and a connection member 50f. More specifically, the nozzle guide 10f differs from the nozzle guide 10e of the sixth embodiment, for example, in that instead of the third flow path wall 283e of the engagement portion 28e, part of the outer circumferential surface 27 of a flow path formation portion 26f configures a tenth flow path wall 271f and that part of the outer surface of an accommodation portion 23f forms an eleventh flow path wall 231f. Since the other configurations are the same as those of the nozzle guide 10e in the sixth embodiment, the same configurations are identified with the same symbols, and the detailed description thereof will be omitted.

Figure 29:
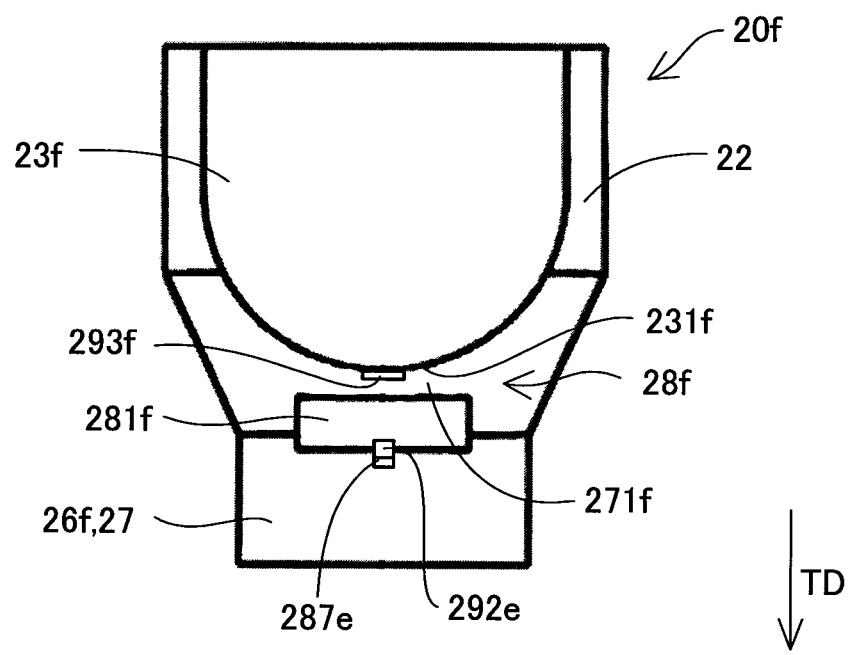
FIG. 29 is a front view showing a schematic configuration of a main body portion in the seventh embodiment.
Figure 30:
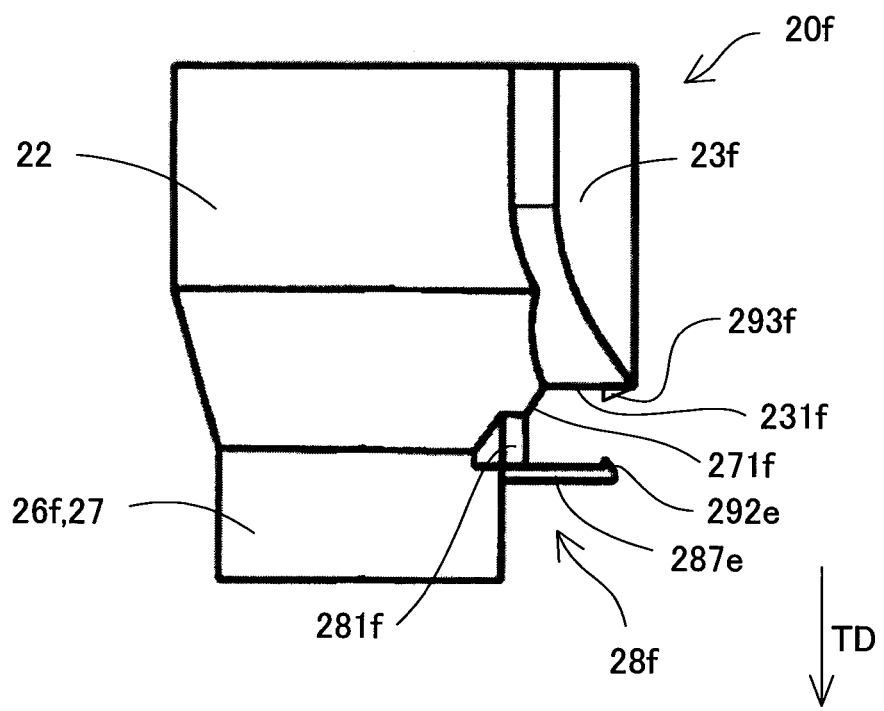
FIG. 30 is a side view showing a schematic configuration of the main body portion in the seventh embodiment.

FIG. 29 is a front view showing a schematic configuration of the main body portion 20f. FIG. 30 is a side view showing a schematic configuration of the main body portion 20f. As shown in FIGS. 26 to 30, an engagement portion 28f included in the main body portion 20f of the seventh embodiment is formed slightly on the upstream side in the tank direction TD with respect to the engagement portion 28e of the sixth embodiment. The dimension of a first flow path wall 281f along the tank direction TD is shorter than that of the first wall portion 286b of the sixth embodiment, the flow path wall is configured and instead of the first engagement protrusion 291e formed on the third flow path wall 283e, a third engagement protrusion 293f is formed on the outer surface of the accommodation portion 23f.

The first flow path wall 281f is formed on the outer circumferential surface 27 of the flow path formation portion 26f along the tank direction TD. As shown in FIGS. 27 and 30, on the outer circumferential surface 27 of the flow path formation portion 26f, in the same position as the first flow path wall 281f in the circumferential direction, part on the upstream side with respect to the first flow path wall 281f in the tank direction TD forms the tenth flow path wall 271f. In a state where the connection member 50f engages with the main body portion 20f so as to be fixed thereto, the tenth flow path wall 271f forms part of the vapor flow path 220 for the fuel vapor.

In an end portion of the outer surface of the accommodation portion 23f formed in the main body portion 20f on the downstream side outward in the radial direction and in the tank direction TD, the third engagement protrusion 293f shown in FIGS. 27, 29 and 30 is formed so as to protrude toward the downstream side in the tank direction TD. The third engagement protrusion 293f engages with a third engaged portion 583f of the connection member 50f which will be described later. As shown in FIGS. 27 and 30, part of the outer surface of the accommodation portion 23f on the downstream side in the tank direction TD configures the eleventh flow path wall 231f. In the state where the connection member 50f engages with the main body portion 20f so as to be fixed thereto, the eleventh flow path wall 231f forms a ceiling part of the vapor flow path 220 for the fuel vapor. In the present embodiment, as shown in FIG. 29, the eleventh flow path wall 231f is formed in the shape of a curved surface which is convex toward the downstream side in the tank direction TD.

Figure 31:
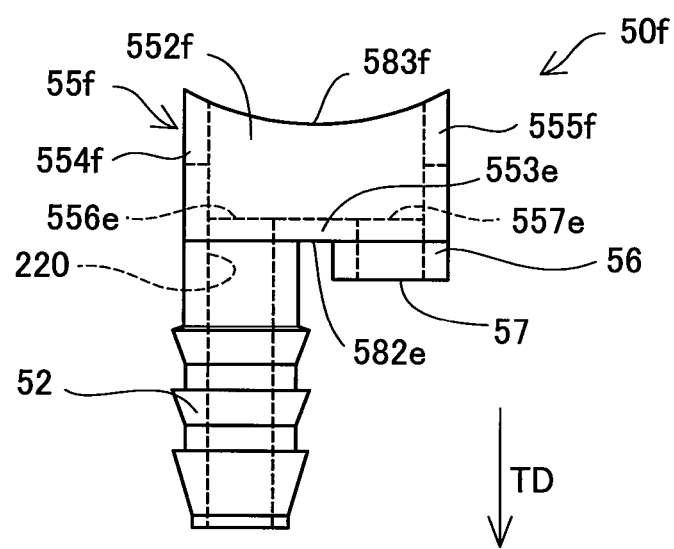
FIG. 31 is a front view showing a schematic configuration of a connection member in the seventh embodiment.
Figure 32:
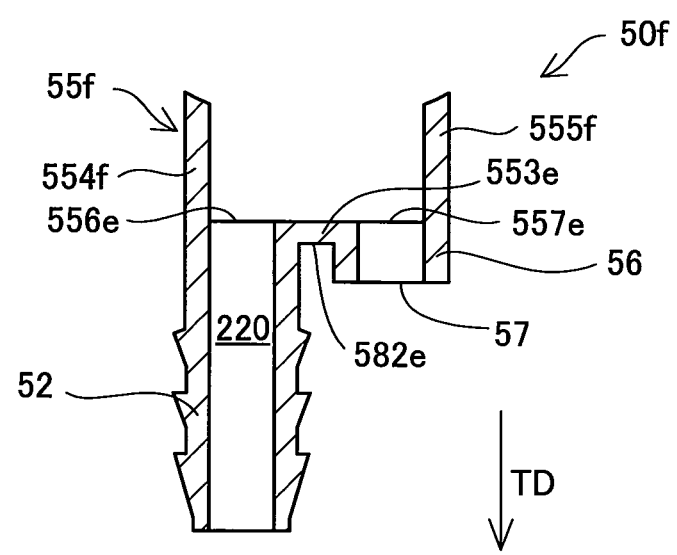
FIG. 32 is a cross-sectional view showing a cross section taken along the line XXXII-XXXII of FIG. 28.

FIG. 31 is a front view showing a schematic configuration of the connection member 50f. FIG. 32 is a cross-sectional view showing a cross section taken along the line XXXII-XXXII of FIG. 28. In FIG. 31, for convenience of description, the vapor flow path 220 is indicated by broken lines.

In the vapor flow path formation portion 55c included in the connection member 50f of the seventh embodiment, as compared with the vapor flow path formation portion 55e of the sixth embodiment, part corresponding to the fifth flow path wall 551e is omitted, and an end portion of a sixth flow path wall 552f shown in FIGS. 28 and 31 on the upstream side in the tank direction TD is formed in the shape of a curved surface which is concave toward the downstream side in the tank direction TD. The shapes of an eighth flow path wall 554f and a ninth flow path wall 555f shown in FIG. 28 are formed so as to correspond to the shapes of the outer circumferential surface 27 of the flow path formation portion 26f and the eleventh flow path wall 231f.

A center portion of the end portion of the sixth flow path wall 552f shown in FIGS. 28 and 31 on the upstream side in the tank direction TD functions as the third engaged portion 583f. The third engaged portion 583f engages with the third engagement protrusion 293f.

Figure 33:
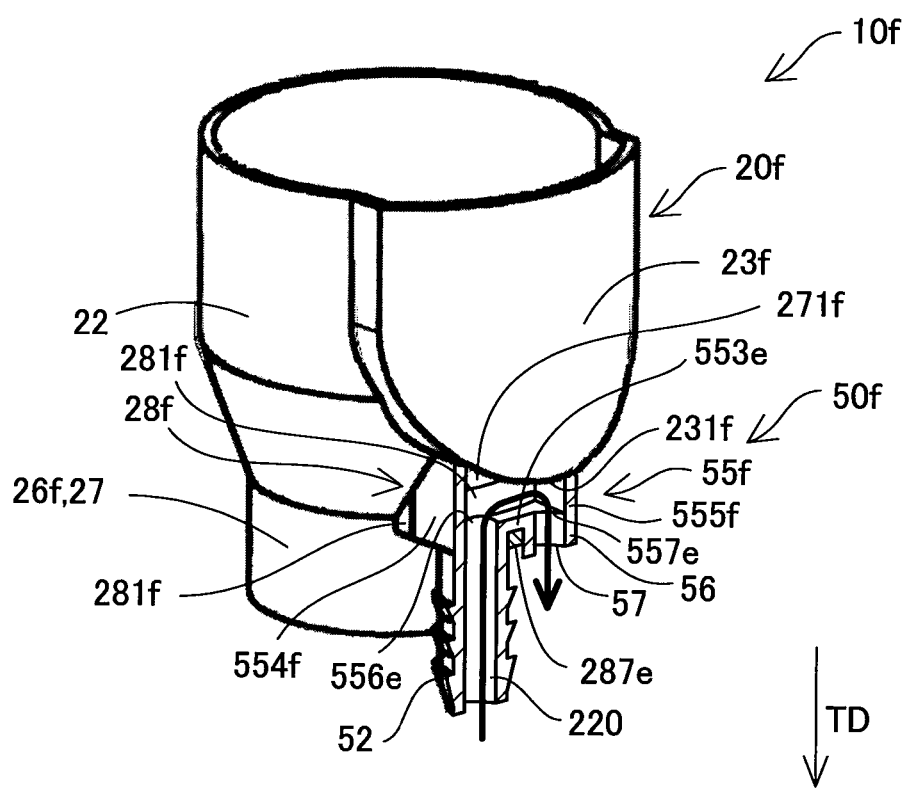
FIG. 33 is a partial cross-sectional view illustrating the configuration of a vapor flow path in the seventh embodiment.

FIG. 33 is a partial cross-sectional view illustrating the configuration of the vapor flow path 220 in the seventh embodiment. FIG. 33 shows, in a perspective view similar to FIG. 26, a cross section of the nozzle guide 10f taken along the line XXXIII-XXXIII shown in FIG. 26. As indicated by a thick arrow in FIG. 33, the fuel vapor flows through a space surrounded by the sixth flow path wall 552f, the seventh flow path wall 553e, the eighth flow path wall 554f and the ninth flow path wall 555f of the connection member 50f and the first flow path wall 281f, the tenth flow path wall 271f and the eleventh flow path wall 231f of the main body portion 20*f*. In the cross section shown in FIG. 33, the sixth flow path wall 552*f* of the vapor flow path formation portion 55*c* does not appear. As described above, part of the vapor flow path 220 in the present embodiment is formed with part of the main body portion 20*f* and the vapor flow path formation portion 55*c*. The engagement portion 28*f* of the seventh embodiment does not form part of the vapor flow path 220.

In the nozzle guide 10*f* of the seventh embodiment described above, the same effects as in the nozzle guide 10*e* of the sixth embodiment are provided. Moreover, part of the vapor flow path 220 is formed with the tenth flow path wall 271*f* which is part of the outer circumferential surface 27 of the flow path formation portion 26*f*, and thus it is possible to achieve, with the flow path formation portion 26*f*, both the function of forming part of the fuel flow path 210 and the function of forming part of the vapor flow path 220. Part of the vapor flow path 220 is formed with the first flow path wall 281*f* that is part of the outer circumferential surface 27 of the flow path formation portion 26*f* which is formed so as to have a diameter smaller than the insertion portion 22 and the tenth flow path wall 271*f*, and thus it is possible to fix, while achieving space saving, the connection member 50*f* to the outer surface of the main body portion 20*f* so as to form the vapor flow path 220. Moreover, part of the vapor flow path 220 is formed with the eleventh flow path wall 231*f* that is part of the outer surface of the accommodation portion 23*f*, and thus it is possible to reduce the size of a region more in which the two members that are the vapor flow path formation portion 55*c* and the main body portion 20*f* are overlaid on each other. Hence, it is possible to fix, while achieving further space saving, the connection member 50*f* to the outer surface of the main body portion 20*f* so as to form the vapor flow path 220.

H. Other Embodiments

[1] Although the connection members 50 and 50*a* to 50*c* in the individual embodiments described above are formed on the outer circumferential surfaces 27 of the flow path formation portions 26 and 26*b* in the tank direction when seen from the accommodation portion 23, the connection members 50 and 50*a* to 50*c* may be formed in a position displaced from the accommodation portion 23 in the circumferential direction. Even in the configuration described above, the same effects as in the individual embodiments described above are achieved.

[2] The configurations of the main body portion 20*b* and the connection members 50*b* and 50*c* in the third and fourth embodiments described above are simply examples, and various modifications are able to be made. For example, although in the third and fourth embodiments described above, the engagement portion 28*b* has an external shape which is formed substantially in the shape of a rectangular parallelepiped that is formed so as to protrude outward in the radial direction, and the engaged portion 58*b* is formed as the through hole, they may be formed in arbitrary shapes which are able to engage with each other. For example, in the engagement portion 28*b*, an engagement groove portion may be formed, and on the engaged portion 58*b*, an engagement protrusion may be formed. For example, the main body portion 20*b* and the connection members 50*b* and 50*c* which are formed as separate members may be fixed to each other by an arbitrary fixing method such as welding instead of the engagement fixing. An embodiment may be provided in which the engagement portion 28*b* does not form part of the vapor flow path 220. In this embodiment, for example, the engagement portion 28*b* may be configured with an engagement protrusion formed on the outer circumferential surface of the main body portion 20*b*, the engaged portions 58*b* of the connection members 50*b* and 50*c* may be configured with only the engagement groove portions 59*b* and the outer circumferential surface of the main body portion 20*b* and the connection members 50*b* and 50*c* may be fixed to each other by welding or the like. Even in the configurations described above, the same effects as in the third and fourth embodiments described above are achieved.

[3] Although in the fourth embodiment described above, the guide portions 54*c* are formed in the connection member 50*c*, instead of or in addition to the guide portions 54*c*, on the inner side of the flow path walls 281 to 284 of the engagement portion 28*b*, arbitrary guide portions may be formed which are able to guide and rectify the flow of the fuel vapor. In other words, the positions of formation, the number, the shape and the like of the guide portions 54*c* may be arbitrarily changed. Even in the configurations described above, it is possible to reduce the occurrence of a turbulence of the fuel vapor, and the same effects as in the fourth embodiment described above are achieved.

[4] The configurations of the nozzle guides 10, 10*a* and 10*b* and the fuel supply device 100 in the individual embodiments described above are simply examples, and various modifications are able to be made. For example, in the nozzle guides 10, 10*a* and 10*b*, the accommodation portion 23 may be omitted. The method of connecting the connection portions 52 and 52*a* of the connection members 50 and 50*a* to 50*c* to the upstream end 122 of the breather pipe 120 is not limited to the press-fitting, and an arbitrary method of connecting them to the breather pipe 120 may be adopted. For example, the fuel supply device 100 may include a fuel cap instead of the opening formation member 130.

[5] The configurations of the engagement portions 28 and 28*d* to 28*f* in the individual embodiments described above are simply examples, and various modifications are able to be made. For example, the engagement portions 28 and 28*d* to 28*f* do not need to be formed in the tank direction when seen from the accommodation portions 23 and 23*f*. In other words, the engagement portions 28 and 28*d* to 28*f* may be formed in positions displaced from the accommodation portions 23 and 23*f* in the circumferential direction. For example, the engagement portions 28 and 28*d* to 28*f* may be provided on the outer circumferential surface of the insertion portion 22. For example, the engagement portions 28 and 28*d* to 28*f* may be formed such that the upper end portions 51 of the connection members 50 and 50*d* to 50*f* are on the upstream side in the tank direction TD with respect to the tip end portion 152 of the refueling nozzle 150. For example, the engagement portions 28 and 28*d* to 28*f* may be formed in arbitrary shapes which are able to respectively engage with the engaged portion 58, the first engaged portions 581*e*, the second engaged portion 582*e* and third engaged portion 583*f*, and for example, in the engagement portions 28 and 28*d* to 28*f*, engagement groove portions may be formed, and in the connection members 50 and 50*d* to 50*f*, engagement protrusions may be formed. Even in the configurations described above, the same effects as in the individual embodiments described above are achieved.

[6] Although in the individual embodiments described above, the angle formed by the direction in which the discharge flow path formation portions 56 of the connection members 50 and 50*d* to 50*f* are provided so as to extend and the tank direction TD is 0°, the angle may fall within a range equal to or greater than 0° and less than 90°. For example, the connection portion 52 and the discharge flow path formation portion 56 may be provided so as to extend in such directions that as the connection portion 52 and the discharge flow path formation portion 56 are extended toward the tank direction TD, they are extended away from each other. When the angle formed by the direction in which the discharge flow path formation portion 56 is provided so as to extend and the tank direction TD is less than 90°, the fuel vapor discharged from the opening 57 is made to flow in the tank direction TD together with the flow of the fuel discharged from the refueling nozzle 150 at the time of refueling. Hence, it is possible to rectify the fuel vapor toward the tank direction TD so as to discharge it from the opening 57, and thus it is possible to return the fuel vapor to the fuel tank FT so as to circulate it, with the result that it is possible to reduce the flow of the fuel vapor out from the refueling port FC. An embodiment may be provided in which the angle formed by the direction in which the discharge flow path formation portion 56 is provided so as to extend and the tank direction TD is equal to or greater than 90°. In this embodiment, it is possible to fix the upstream end 122 of the breather pipe 120 to the nozzle guides 10, 10e and 10f, and thus it is possible to simplify the fixed structure of the breather pipe 120, with the result that it is possible to enhance the assembly of the breather pipe 120.

[7] Although in the fifth embodiment described above, in the connection member 50d and the second flow path wall 282a of the engagement portion 28d, the guide portions 54d and 24d for guiding the flow of the fuel vapor are respectively formed, one of the guide portions 54d and 24d may be omitted, and instead of or in addition to the guide portions 54d and 24d, arbitrary guide portions which are able to guide and rectify the flow of the fuel vapor may be formed. For example, in the flow path walls of the individual embodiments described above, arbitrary guide portions which are able to guide and rectify the flow of the fuel vapor may be formed. In other words, the positions of formation, the number, the shape and the like of the guide portions may be arbitrarily changed. Even in the configurations described above, it is possible to reduce the occurrence of a turbulence of the fuel vapor, and the same effects as in the fifth embodiment described above are achieved.

[8] The configurations of the nozzle guides 10, 10e and 10f and the fuel supply device 100 in the individual embodiments described above are simply examples, and various modifications are able to be made. For example, an embodiment may be provided in which part of the main body portions 20, 20e and 20f do not configure flow path walls that form part of the vapor flow path 220. In the embodiment described above, part of the vapor flow path 220 may be formed with only the vapor flow path formation portions 55 and 55d to 55f of the connection members 50 and 50d to 50f. For example, the accommodation portions 23 and 23f of the nozzle guides 10, 10e and 10f may be omitted. For example, the method of connecting the connection portions 52 of the connection members 50 and 50d to 50f to the upstream end 122 of the breather pipe 120 is not limited to the press-fitting, and an arbitrary method of connecting them to the breather pipe 120 may be adopted. For example, the fuel supply device 100 may include a fuel cap instead of the opening formation member 130.

The present disclosure is not limited to the individual embodiments described above, and it is possible to realize embodiments with various configurations without departing from the spirit thereof. For example, technical features in embodiments corresponding to the technical features in the individual embodiments described in the summary of disclosure are able to be replaced or combined as necessary in order to solve part or all of the problems described above or to achieve part or all of the effects described above. When the technical features are not described as essential features in the present specification, they are able to be removed as necessary. For example, the present disclosure may be realized with embodiments which will be described below.

[a1] According to an embodiment of the present disclosure, a nozzle guide is provided. The nozzle guide is a nozzle guide which is arranged, in a fuel supply device, within a filler pipe that forms a fuel flow path for a fuel supplied from a refueling nozzle, and includes: a main body portion which guides the insertion and removal of the refueling nozzle; and a connection member which is provided on an outer circumferential surface of the main body portion and in which an upper end portion of the connection member is located, in a tank direction extending from a refueling port toward a fuel tank, on a downstream side with respect to a tip end portion of the refueling nozzle inserted into the main body portion, and the connection member includes: a connection portion which is connected to a breather pipe that is arranged within the filler pipe and that discharges fuel vapor within the fuel tank; and a vapor flow path formation portion which communicates with the breather pipe through the connection portion and which forms part of a vapor flow path for the fuel vapor that flows in through the breather pipe and the connection portion. In the nozzle guide of this embodiment, the connection member which includes the connection portion connected to the breather pipe is provided on the outer circumferential surface of the main body portion, and thus it is possible to fix the breather pipe to the nozzle guide. Hence, in a so-called fuel supply device having an inner breather specification in which the breather pipe is arranged within the filler pipe, it is possible to simplify the fixed structure of the breather pipe, with the result that it is possible to enhance the assembly of the breather pipe. The connection member includes the vapor flow path formation portion which forms part of the vapor flow path for the fuel vapor, and thus it is possible to rectify the flow of the fuel vapor discharged from the breather pipe. Hence, it is possible to reduce the bubbling of the supplied fuel caused by the fuel vapor, and thus it is possible to reduce the lowering of the refueling. The upper end portion of the connection member in the tank direction is located on the downstream side with respect to the tip end portion of the refueling nozzle which is inserted into the main body portion, and thus when the tip end portion of the refueling nozzle collides with the inner circumferential surface of the nozzle guide, it is possible to reduce the deformation and damage of the connection member. Consequently, it is possible to reduce the inhibition of the function of fixing the breather pipe to the nozzle guide.

[a2] In the nozzle guide of the embodiment described above, the main body portion may include: an insertion portion into which the tip end portion is inserted; and a flow path formation portion which communicates with the insertion portion in the tank direction, which is formed so as to have a diameter smaller than the insertion portion and which forms part of the fuel flow path, and the connection member may be provided on an outer circumferential surface of the flow path formation portion. In the nozzle guide of this embodiment, the connection member is provided on the outer circumferential surface of the flow path formation portion which is formed so as to have a diameter smaller than the insertion portion, and thus it is possible to reduce an increase in the dimension of the nozzle guide in the radial direction in order to provide the connection member, with the result that it is possible to easily realize the configuration in which the upper end portion of the connection member is located on the downstream side in the tank direction with respect to the tip end portion of the refueling nozzle.

[a3] In the nozzle guide of the embodiment described above, in part of the insertion portion in a circumferential direction, an accommodation portion may be formed which is able to accommodate at least part of an opening/closing member for opening and closing the fuel flow path, and the connection member may be formed in the tank direction when seen from the accommodation portion. In the nozzle guide of this embodiment, since the connection member is formed in the tank direction when seen from the accommodation portion, a dead space is utilized, and thus the connection member is able to be arranged, with the result that it is possible to achieve space saving.

[a4] In the nozzle guide of the embodiment described above, one end of the vapor flow path formation portion may communicate with the connection portion, and in the other end, a discharge flow path formation portion may be provided in which an opening for returning the fuel vapor into the filler pipe is formed, and an angle formed by a direction in which the discharge flow path formation portion is provided so as to extend and the tank direction may be equal to or greater than 0° and less than 90°. In the nozzle guide of this embodiment, the angle formed by the direction in which the discharge flow path formation portion is provided so as to extend and the tank direction is equal to or greater than 0° and less than 90°, and thus it is possible to rectify the fuel vapor toward the tank direction so as to discharge the fuel vapor from the opening. Hence, it is possible to return the fuel vapor to the fuel tank so as to circulate it, and thus it is possible to reduce the flow of the fuel vapor out from the refueling port.

[a5] In the nozzle guide of the embodiment described above, the angle may be 0°. In the nozzle guide of this embodiment, the angle formed by the direction in which the discharge flow path formation portion is provided so as to extend and the tank direction is 0°, and thus it is possible to rectify the fuel vapor toward the tank direction so as to discharge the fuel vapor from the opening, with the result that it is possible to reduce the flow of the fuel vapor out from the refueling port.

[a6] In the nozzle guide of the embodiment described above, the main body portion may include an engagement portion on the outer circumferential surface, and the connection member may include an engaged portion which engages with the engagement portion, and may engage with the main body portion so as to be fixed thereto. In the nozzle guide of this embodiment, the engagement portion formed on the outer circumferential surface of the main body portion and the engaged portion of the connection member engage with each other, and thus the main body portion and the connection member engage with each other so as to be fixed to each other, with the result that after the breather pipe is connected to the connection member, the connection member and the main body portion are able to be integrated. Hence, it is possible to enhance the assembly of the breather pipe more.

[b1] According to an embodiment of the present disclosure, a nozzle guide is provided. The nozzle guide is a nozzle guide which is arranged, in a fuel supply device, within a filler pipe that forms a fuel flow path for a fuel supplied from a refueling nozzle, and includes: a main body portion which includes an engagement portion on the outer surface of the main body portion and which guides the insertion and removal of the refueling nozzle; and a connection member which is connected to a breather pipe that is arranged within the filler pipe and that discharges fuel vapor within the fuel tank and which forms at least part of a fuel flow path for the fuel vapor, and the connection member includes: an engaged portion which engages with the engagement portion and which engages with the main body portion in the engaged portion so as to be fixed thereto. In the nozzle guide of this embodiment, the engaged portion formed in the connection member connected to the breather pipe engages with the engagement portion formed on the outer surface of the main body portion, and thus the connection member engages with the main body portion so as to be fixed thereto. As described above, it is possible to provide the connection member in the nozzle guide by engagement fixing, and thus it is possible to easily integrate the connection member and the main body portion after the breather pipe is connected to the connection member. Hence, in a so-called fuel supply device having an inner breather specification in which the breather pipe is arranged within the filler pipe, it is possible to enhance the assembly of the breather pipe.

[b2] In the nozzle guide of the embodiment described above, part of the main body portion may configure a flow path wall which forms part of the vapor flow path. In the nozzle guide of this embodiment, part of the main body portion configures the flow path wall which forms part of the vapor flow path, and thus it is possible to omit part of a portion of the vapor flow path in the connection member. Hence, it is possible to fix, while achieving space saving, the connection member to the outer surface of the main body portion so as to form the vapor flow path.

[b3] In the nozzle guide of the embodiment described above, the flow path wall may be configured with part of the engagement portion. In the nozzle guide of this embodiment, the flow path wall is formed with part of the engagement portion, and thus it is possible to achieve, with the engagement portion, both the function of fixing the connection member to the main body portion and the function of forming part of the vapor flow path. Hence, it is possible to fix, while achieving space saving, the connection member to the outer surface of the main body portion so as to form the vapor flow path.

[b4] In the nozzle guide of the embodiment described above, the main body portion may include: an insertion portion in which an accommodation portion that is able to accommodate at least part of an opening/closing member for opening and closing the fuel flow path is formed in part of the insertion portion in a circumferential direction and into which the tip end portion of the refueling nozzle is inserted; and a flow path formation portion which communicates with the insertion portion in the tank direction extending from the refueling port toward the fuel tank, which is formed so as to have a diameter smaller than the insertion portion and which forms part of the fuel flow path, and the flow path wall may be configured with part of an outer circumferential surface of the flow path formation portion. In the nozzle guide of this embodiment, the flow path wall is configured with part of the outer circumferential surface of the flow path formation portion which is formed so as to have a diameter smaller than the insertion portion and which forms part of the fuel flow path, and thus it is possible to achieve, with the flow path formation portion, both the function of forming part of the fuel flow path and the function of forming part of the vapor flow path, with the result that it is possible to fix, while achieving further space saving, the connection member to the outer surface of the main body portion so as to form the vapor flow path.

[b5] In the nozzle guide of the embodiment described above, on the flow path wall, a guide portion may be formed which guides the flow of the fuel vapor. In the nozzle guide of this embodiment, the guide portion which guides the flow of the fuel vapor is formed on the flow path wall, and thus it is possible to reduce a pressure loss so as to smooth the flow of the fuel vapor more.

[b6] In the nozzle guide of the embodiment described above, the main body portion may include: the insertion portion in which the accommodation portion that is able to accommodate at least part of the opening/closing member for opening and closing the fuel flow path is formed in part of the insertion portion in the circumferential direction and into which the tip end portion of the refueling nozzle is inserted; and the flow path formation portion which communicates with the insertion portion in the tank direction extending from the refueling port toward the fuel tank, which is formed so as to have a diameter smaller than the insertion portion and which forms part of the fuel flow path, and the engagement portion may be formed in the tank direction when seen from the accommodation portion. In the nozzle guide of this embodiment, the engagement portion is formed in the tank direction when seen from the accommodation portion, and thus it is possible to arrange the connection member inward in the radial direction with respect to the accommodation portion. Hence, it is possible to reduce an increase in the dimension of the nozzle guide in the radial direction in order to provide the connection member.

[b7] In the nozzle guide of the embodiment described above, the upper end portion of the connection member may be located, in the tank direction extending from the refueling port toward the fuel tank, on the downstream side with respect to the tip end portion of the refueling nozzle inserted into the main body portion. In the nozzle guide of this embodiment, the upper end portion of the connection member is located on the downstream side with respect to the tip end portion of the refueling nozzle which is inserted into the main body portion, and thus when the tip end portion of the refueling nozzle collides with the inner circumferential surface of the nozzle guide, it is possible to reduce the deformation and damage of the connection member. Consequently, it is possible to reduce the inhibition of the function of fixing the breather pipe to the nozzle guide.

[b8] In the nozzle guide of the embodiment described above, one end of the connection member may be connected to the breather pipe, and in the side of the other end, a discharge flow path formation portion may be provided in which an opening for returning the fuel vapor into the filler pipe is formed, and an angle formed by a direction in which the discharge flow path formation portion is provided so as to extend and the tank direction extending from the refueling port toward the fuel tank may be equal to or greater than 0° and less than 90°. In the nozzle guide of this embodiment, the angle formed by the direction in which the discharge flow path formation portion is provided so as to extend and the tank direction is equal to or greater than 0° and less than 90°, and thus it is possible to rectify the fuel vapor toward the tank direction so as to discharge the fuel vapor from the opening. Hence, it is possible to return the fuel vapor to the fuel tank so as to circulate it, and thus it is possible to reduce the flow of the fuel vapor out from the refueling port.

[b9] In the nozzle guide of the embodiment described above, the angle may be 0°. In the nozzle guide of this embodiment, the angle formed by the direction in which the discharge flow path formation portion is provided so as to extend and the tank direction is 0°, and thus it is possible to rectify the fuel vapor toward the tank direction so as to discharge the fuel vapor from the opening, with the result that it is possible to reduce the flow of the fuel vapor out from the refueling port.

[b10] In the nozzle guide of the embodiment described above, the connection member may include a guide portion which guides the flow of the fuel vapor. In the nozzle guide of this embodiment, the guide portion which guides the flow of the fuel vapor is formed in the connection member, and thus it is possible to reduce a pressure loss so as to smooth the flow of the fuel vapor more. [b11] In the nozzle guide of the embodiment described above, on the engagement portion, an engagement protrusion may be formed, and in the engaged portion, an engagement groove portion may be formed which engages with the engagement protrusion. In the nozzle guide of this embodiment, the engagement protrusion is formed on the engagement portion, in the engaged portion, the engagement groove portion is formed which engages with the engagement protrusion and thus it is possible to easily make the engagement portion and the engaged portion engage with each other, with the result that it is possible to enhance the assembly of the breather pipe more.

The present disclosure is also able to be realized with various embodiments. For example, the present disclosure is able to be realized with embodiments such as a method of manufacturing a nozzle guide and a fuel supply device which includes a nozzle guide.

What is claimed is:

1. A nozzle guide that is arranged, in a fuel supply device, within a filler pipe that forms a fuel flow path for a fuel supplied from a refueling nozzle, the nozzle guide comprising:
    a main body portion configured to guide insertion and removal of the refueling nozzle; and
    a connection member provided on an outer circumferential surface of the main body portion and in which an upper end portion of the connection member is located, in a tank direction extending from a refueling port toward a fuel tank, on a downstream side with respect to a tip end portion of the refueling nozzle inserted into the main body portion,
    wherein
    the connection member includes:
        a connection portion connected to a breather pipe that is arranged within the filler pipe and that discharges fuel vapor within the fuel tank; and
        a vapor flow path formation portion configured to communicate with the breather pipe through the connection portion and to form part of a vapor flow path for the fuel vapor that flows in through the breather pipe and the connection portion,
    wherein
    the main body portion includes: an insertion portion into which the tip end portion is inserted; and a flow path formation portion configured to communicate with the insertion portion in the tank direction, that is formed so as to have a diameter smaller than the insertion portion and which forms part of the fuel flow path, and
    the connection member is provided on an outer circumferential surface of the flow path formation portion.

2. The nozzle guide according to claim 1,
    wherein in part of the insertion portion in a circumferential direction, an accommodation portion configured to accommodate at least part of an opening/closing member for opening and closing the fuel flow path is formed, and the connection member is formed in the tank direction when seen from the accommodation portion.

3. The nozzle guide according to claim 1,
wherein one end of the vapor flow path formation portion communicates with the connection portion, and in the other end, a discharge flow path formation portion is provided in which an opening for returning the fuel vapor into the filler pipe is formed, and
an angle formed by a direction in which the discharge flow path formation portion extends, and the tank direction is equal to or greater than 0° and less than 90°.

4. The nozzle guide according to claim 3,
wherein the angle is 0°.

5. The nozzle guide according to claim 1,
wherein the main body portion includes an engagement portion on the outer circumferential surface, and
the connection member includes an engaged portion configured to engage with the engagement portion, and engages with the main body portion so as to be fixed thereto.

6. A nozzle guide that is arranged, in a fuel supply device, within a filler pipe that forms a fuel flow path for a fuel supplied from a refueling nozzle, the nozzle guide comprising:
a main body portion configured to guide insertion and removal of the refueling nozzle; and
a connection member provided on an outer circumferential surface of the main body portion and in which an upper end portion of the connection member is located, in a tank direction extending from a refueling port toward a fuel tank, on a downstream side with respect to a tip end portion of the refueling nozzle inserted into the main body portion,
wherein
the connection member includes:
  a connection portion connected to a breather pipe that is arranged within the filler pipe and that discharges fuel vapor within the fuel tank; and
  a vapor flow path formation portion configured to communicate with the breather pipe through the connection portion and to form part of a vapor flow path for the fuel vapor that flows in through the breather pipe and the connection portion,
the main body portion includes an engagement portion on an outer surface of the main body portion,
the connection member includes an engaged portion configured to engage with the engagement portion, and engages with the main body portion in the engaged portion so as to be fixed thereto,
part of the main body portion configures a flow path wall which forms part of the vapor flow path, and
the flow path wall is configured with part of the engagement portion.

7. The nozzle guide according to claim 6,
wherein the main body portion includes:
an insertion portion in which an accommodation portion configured to accommodate at least part of an opening/closing member for opening and closing the fuel flow path is formed in part of the insertion portion in a circumferential direction and into which the tip end portion of the refueling nozzle is inserted; and
a flow path formation portion that communicates with the insertion portion in the tank direction extending from the refueling port toward the fuel tank, that is formed so as to have a diameter smaller than the insertion portion and that forms part of the fuel flow path, and
the flow path wall is configured with part of an outer circumferential surface of the flow path formation portion.

8. The nozzle guide according to claim 6,
wherein on the flow path wall, a guide portion configure to guide a flow of the fuel vapor is formed.

9. A nozzle guide that is arranged, in a fuel supply device, within a filler pipe that forms a fuel flow path for a fuel supplied from a refueling nozzle, the nozzle guide comprising:
a main body portion configured to guide insertion and removal of the refueling nozzle; and
a connection member provided on an outer circumferential surface of the main body portion and in which an upper end portion of the connection member is located, in a tank direction extending from a refueling port toward a fuel tank, on a downstream side with respect to a tip end portion of the refueling nozzle inserted into the main body portion,
wherein
the connection member includes:
  a connection portion connected to a breather pipe that is arranged within the filler pipe and that discharges fuel vapor within the fuel tank; and
  a vapor flow path formation portion configured to communicate with the breather pipe through the connection portion and to form part of a vapor flow path for the fuel vapor that flows in through the breather pipe and the connection portion,
the main body portion includes an engagement portion on an outer surface of the main body portion,
the connection member includes an engaged portion configured to engage with the engagement portion, and engages with the main body portion in the engaged portion so as to be fixed thereto,
the main body portion includes:
an insertion portion in which an accommodation portion configured to accommodate at least part of an opening/closing member for opening and closing the fuel flow path is formed in part of the insertion portion in a circumferential direction and into which the tip end portion of the refueling nozzle is inserted; and
a flow path formation portion that communicates with the insertion portion in the tank direction extending from the refueling port toward the fuel tank, that is formed so as to have a diameter smaller than the insertion portion and that forms part of the fuel flow path, and
the engagement portion is formed in the tank direction when seen from the accommodation portion.

10. The nozzle guide according to claim 9,
wherein the upper end portion of the connection member is located, in the tank direction extending from the refueling port toward the fuel tank, on the downstream side with respect to the tip end portion of the refueling nozzle inserted into the main body portion.

11. The nozzle guide according to claim 9,
wherein one end of the connection member is connected to the breather pipe, and in a side of the other end, a discharge flow path formation portion is provided in which an opening for returning the fuel vapor into the filler pipe is formed, and an angle formed by a direction in which the discharge flow path formation portion is provided so as to extend and the tank direction extending from the refueling port toward the fuel tank is equal to or greater than 0° and less than 90°.

12. The nozzle guide according to claim 11,
wherein the angle is 0°.

13. The nozzle guide according to claim 9,
wherein the connection member includes a guide portion configured to guide a flow of the fuel vapor.

14. The nozzle guide according to claim 11,
wherein on the engagement portion, an engagement protrusion is formed, and
in the engaged portion, an engagement groove portion configured to engage with the engagement protrusion is formed.

* * * * *